US009778766B2

(12) United States Patent
Choi et al.

(10) Patent No.: US 9,778,766 B2
(45) Date of Patent: Oct. 3, 2017

(54) MOBILE TERMINAL AND CONTROL METHOD THEREOF

(71) Applicant: LG ELECTRONICS INC., Seoul (KR)

(72) Inventors: Jaeho Choi, Seoul (KR); Jumin Chi, Busan (KR); Jiyoung Park, Gyeonggi-Do (KR); Sujin Kim, Busan (KR); Sunghye Yoon, Busan (KR)

(73) Assignee: LG ELECTRONICS INC., Seoul (KR)

(*) Notice: Subject to any disclaimer, the term of this patent is extended or adjusted under 35 U.S.C. 154(b) by 177 days.

(21) Appl. No.: 13/772,850

(22) Filed: Feb. 21, 2013

(65) Prior Publication Data

US 2013/0300682 A1  Nov. 14, 2013

(30) Foreign Application Priority Data

May 9, 2012 (KR) .................... 10-2012-0049342

(51) Int. Cl.

| G06F 3/041 | (2006.01) |
| G06F 3/0487 | (2013.01) |
| G06F 3/01 | (2006.01) |
| G06F 3/0482 | (2013.01) |
| G06F 3/0484 | (2013.01) |
| H04M 1/02 | (2006.01) |
| H04M 1/725 | (2006.01) |

(52) U.S. Cl.
CPC ............ *G06F 3/041* (2013.01); *G06F 3/017* (2013.01); *G06F 3/0482* (2013.01); *G06F 3/0484* (2013.01); *G06F 3/0487* (2013.01); *H04M 1/0268* (2013.01); *H04M 1/72522* (2013.01)

(58) Field of Classification Search
CPC .................... G09G 2380/02; H04M 1/0206
USPC ........................................... 455/566
See application file for complete search history.

(56) References Cited

U.S. PATENT DOCUMENTS

| 2007/0085845 A1* | 4/2007 | Kikuchi et al. ............... 345/204 |
| 2007/0242033 A1* | 10/2007 | Cradick et al. ............... 345/156 |
| 2010/0011291 A1 | 1/2010 | Nurmi ........................... 715/702 |

(Continued)

FOREIGN PATENT DOCUMENTS

| CN | 101059950 | 10/2007 |
| CN | 102089737 | 6/2011 |
| EP | 2 166 443 | 3/2010 |

OTHER PUBLICATIONS

European Search Report issued in related Application No. 13160866.3 dated Sep. 19, 2013.

(Continued)

*Primary Examiner* — Alexander Eisen
*Assistant Examiner* — Kebede Teshome
(74) *Attorney, Agent, or Firm* — KED & Associates, LLP

(57) ABSTRACT

Provided is a mobile terminal that includes a flexible display configured to bend a prescribed amount, a sensor configured to sense bending of the flexible display, and a controller configured to control the flexible display based on the sensed bending. The controller may detect an event associated with an application program, control the sensor to sense the bending of the flexible display in response to the detected event, and control the flexible display to display event information corresponding to the event on the flexible display according to the sensed bending.

15 Claims, 26 Drawing Sheets

(56) References Cited

U.S. PATENT DOCUMENTS

| | | |
|---|---|---|
| 2010/0056223 A1* | 3/2010 | Choi et al. ............... 455/566 |
| 2010/0060548 A1* | 3/2010 | Choi et al. ............... 345/1.3 |
| 2010/0120470 A1* | 5/2010 | Kim et al. ............... 455/566 |
| 2010/0141605 A1* | 6/2010 | Kang et al. ............... 345/174 |
| 2010/0164888 A1* | 7/2010 | Okumura ............ G06F 1/1626 |
| | | 345/173 |
| 2011/0057873 A1* | 3/2011 | Geissler et al. ............ 345/156 |
| 2012/0023431 A1* | 1/2012 | Roth .................. G06F 3/0488 |
| | | 715/772 |
| 2012/0262367 A1* | 10/2012 | Chiu et al. ............... 345/156 |
| 2013/0093660 A1* | 4/2013 | Hirsch et al. ............ 345/156 |
| 2013/0285922 A1* | 10/2013 | Alberth, Jr. .......... G06F 1/1694 |
| | | 345/173 |

OTHER PUBLICATIONS

Chinese Office Action dated Mar. 29, 2017 issued in Application No. 201310121550.4 (with English Translation).

* cited by examiner

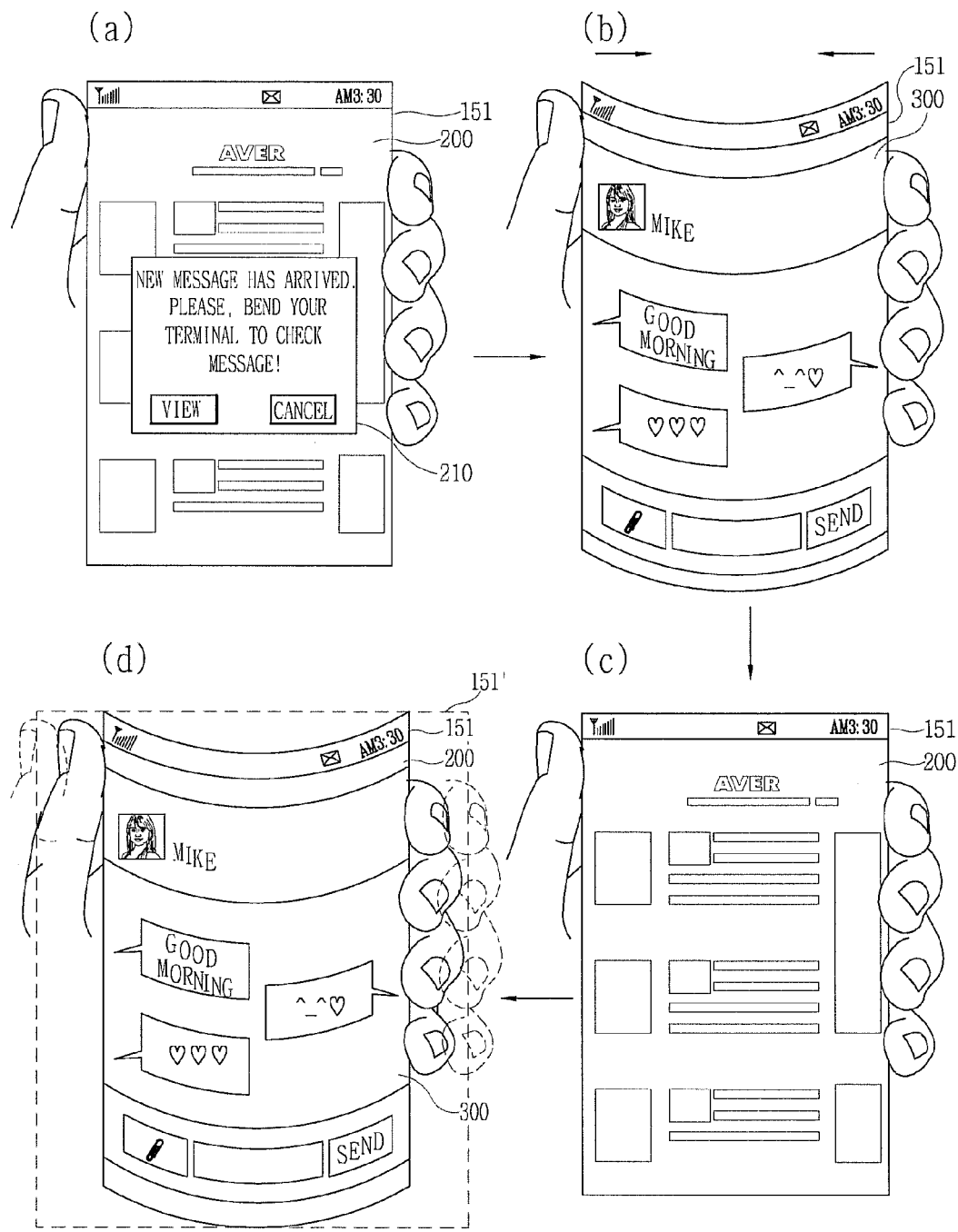

BEFORE REFERENCE TIME ELAPSES

AFTER REFERENCE TIME ELAPSES

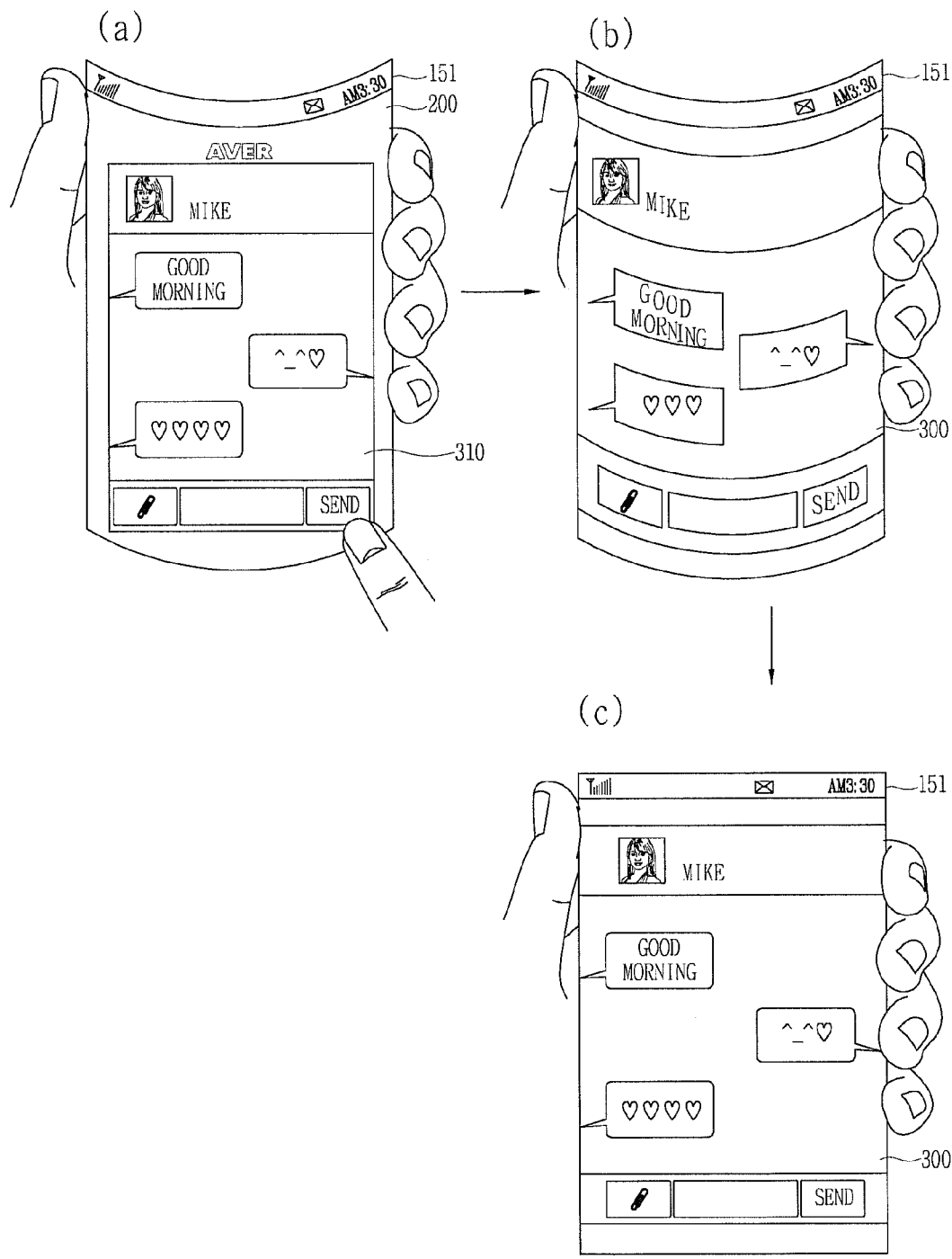

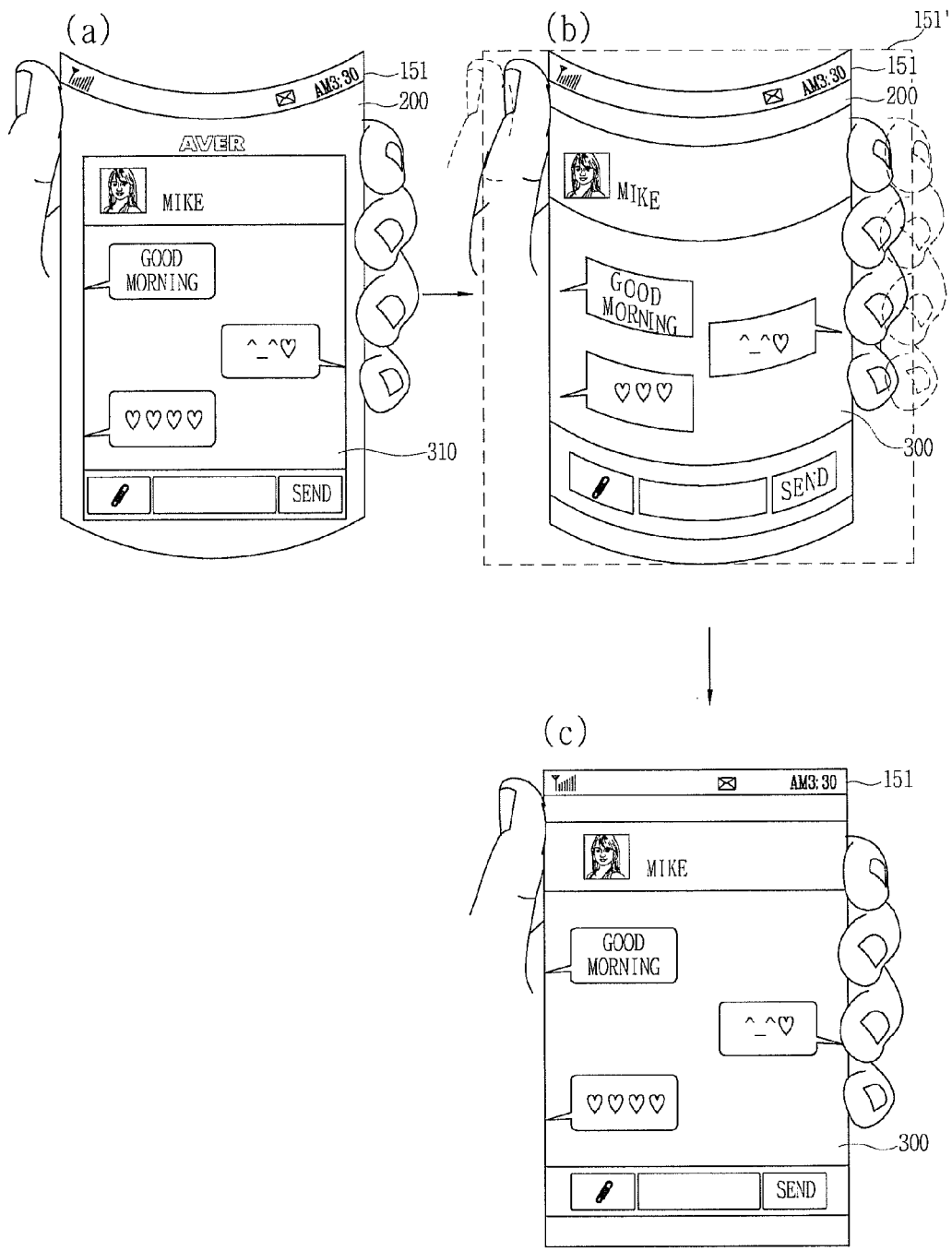

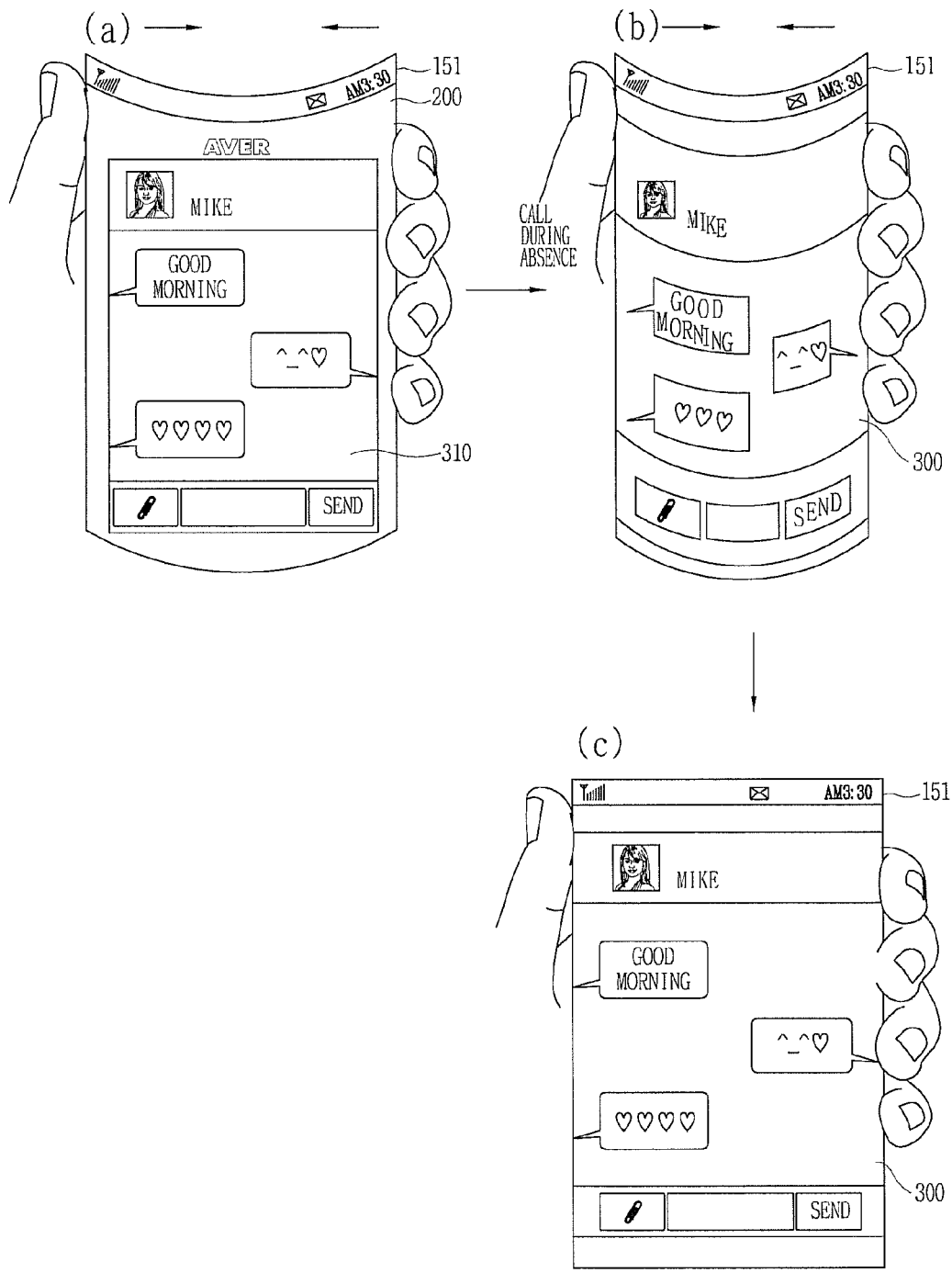

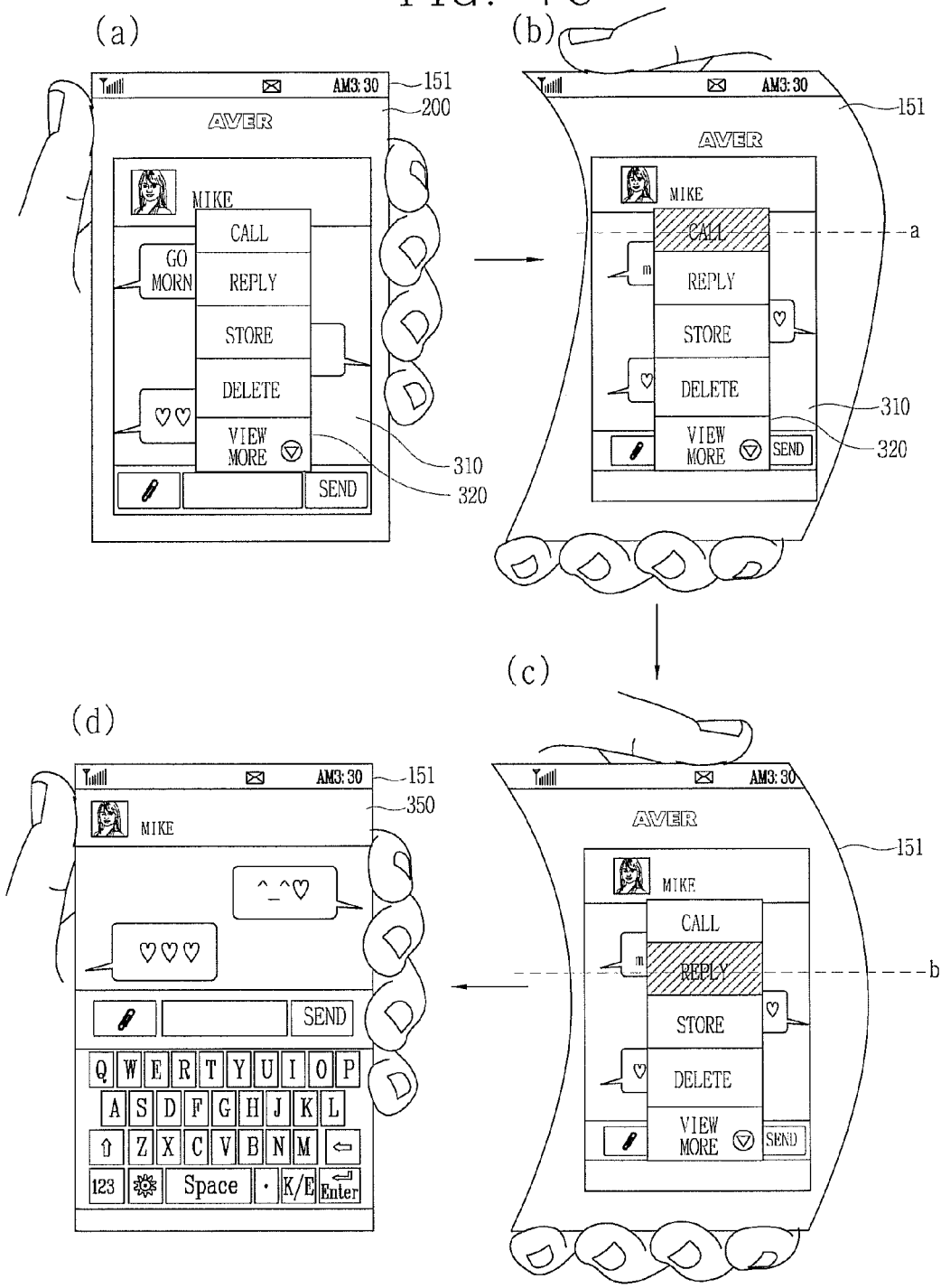

MOBILE TERMINAL AND CONTROL METHOD THEREOF

CROSS-REFERENCE TO RELATED APPLICATION(S)

This application claims priority under 35 U.S.C. §119 to Korean Application No. 10-2012-0049342 filed on May 9, 2012, whose entire disclosure is hereby incorporated by reference.

BACKGROUND

1. Field

The present disclosure relates to a mobile terminal including a flexible display unit and a control method therefor.

2. Background

Terminals can be divided into mobile/portable terminals and stationary terminals according to their mobility. The portable terminals may be divided into handheld terminals and vehicle mount terminals according to whether a user directly carries his or her terminal.

As such a mobile terminal becomes multifunctional, the mobile terminal can be allowed to capture still images or moving images, play music or video files, play games, receive broadcast, etc., so as to be implemented as an integrated multimedia player. In order to support and enhance such functions of the terminal, it may be considered to improve configuration and/or software of the terminal including the input interface for the terminal.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIGS. 4A and 4B are conceptual diagrams illustrating the control method of FIG. 3 described above;

FIGS. 6A to 6G are conceptual diagrams illustrating a method for displaying event information based on bending attribute information of the flexible display unit in the mobile terminal according to an exemplary embodiment;

FIGS. 7A to 7C are conceptual diagrams illustrating a method for performing a function related to an event in the mobile terminal according to an exemplary embodiment.

DETAILED DESCRIPTION

Figure 1:
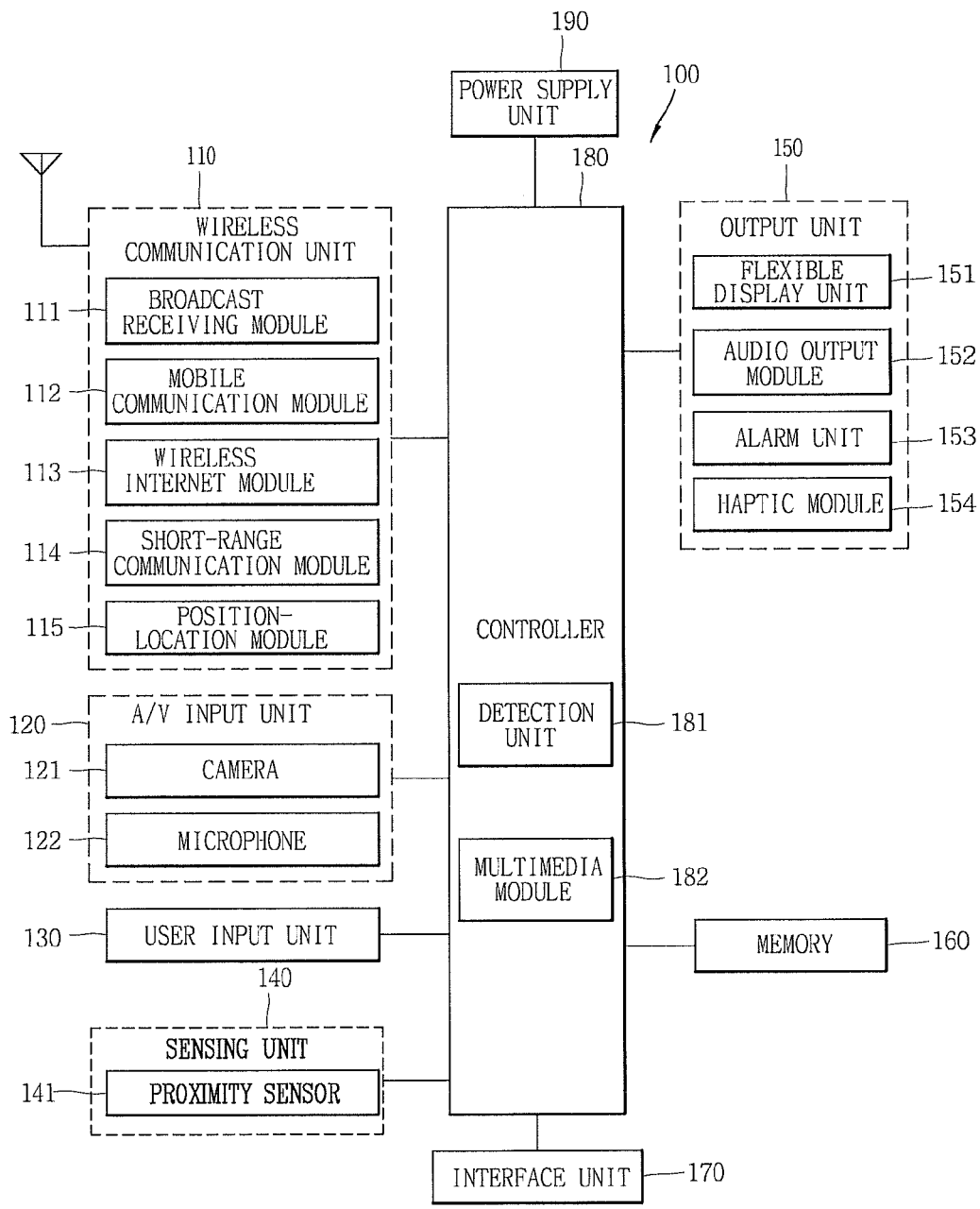
FIG. 1 is a block diagram illustrating a mobile terminal according to an exemplary embodiment.

In general, terminals are developed in various designs, and accordingly, flexible displays attract public attention because of their light and unbreakable characteristics. The flexible displays can create a new user interface field to which the application of existing glass substrate based displays was restrictive or impossible.

As the flexible displays attract public attention, it is required to develop a user-friendly user interface using characteristics of flexible displays. Therefore, an aspect of the detailed description is to provide a mobile terminal and a control method therefor, which can generate a control command using characteristics of a flexible display unit capable of being bended or bent.

To achieve these and other advantages and in accordance with the purpose of this specification, as embodied and broadly described herein, a mobile terminal includes a flexible display unit configured to be bended, corresponding to a physical force applied from an outside thereof; a sensing unit configured to sense bending of the flexible display unit, in response to an event occurring in an application; and a control unit configured to control the flexible display unit so that event information corresponding to the event is output on the flexible display unit according to the sensed result.

In one exemplary embodiment, when the bending of the flexible display unit returns to an original state, the control unit may control the flexible display unit so that the output of the event information is finished.

In one exemplary embodiment, the control unit may control the flexible display unit so that a screen image which has been output on the flexible display unit before the event information was output is again output on the flexible display unit, based on that the output of the event information is finished.

In one exemplary embodiment, when the flexible display unit is bended, corresponding to a reference condition, in the state in which the screen image is output on the flexible display unit, the event information may be again output on the flexible display unit.

In one exemplary embodiment, the control unit may determine whether the region in which the bending of the flexible display unit is sensed corresponds to a predetermined region, and control flexible display unit so that the event information is output on the flexible display unit, based on the determined result.

In one exemplary embodiment, a popup window for informing a user that the event has occurred may be output on the flexible display unit, and when the bending of the flexible display unit is sensed in the state in which the popup window is output on the flexible display unit, the control unit may control the flexible display unit so that the event information is output on the flexible display unit.

In one exemplary embodiment, a preview image including the event information may be output on the flexible display unit, in response to the bending of the flexible display unit, and the control unit may output an execution screen of the application in which the event occurs on the flexible display unit, corresponding to that a user input corresponding to a predetermined method is applied on the flexible display unit, in the state in which the preview image is output on the flexible display unit.

In one exemplary embodiment, the execution screen of the application may be continuously output on the flexible display unit even though the bending of the flexible display unit returns to the original state.

In one exemplary embodiment, the user input corresponding to the predetermined method may be a touch input applied with respect to the preview image or a physical force applied on the flexible display unit.

In one exemplary embodiment, the control unit may control the flexible display unit so that different types of event information corresponding to the event are output on the flexible display unit according to directions in which the flexible display unit is bended.

In one exemplary embodiment, the control unit may output a preview image including the event information on the flexible display unit when the flexible display unit is bend in a first direction, and output an execution screen of the application in which the event occurs on the flexible display unit when the flexible display unit is bended in a second direction.

In one exemplary embodiment, when the flexible display unit is bended in the first or second direction in the state in which the preview image is output on the flexible display unit, the execution screen of the application in which the event occurs may be output on the flexible display unit.

In one exemplary embodiment, the preview image may overlap with the screen image which has been output on the flexible display unit before the event occurred.

In one exemplary embodiment, when a plurality of events occur in the application, a plurality of items respectively corresponding to the plurality of events may be output on the flexible display unit, and the control unit may control the flexible display unit so that event information corresponding to any one of the plurality of events is output on the flexible display unit, based on bending information of the flexible display unit.

In one exemplary embodiment, the bending information may be related to at least one of frequency, direction, depth or maintenance time of bending of the flexible display unit.

In one exemplary embodiment, the control unit may determine whether the bending of the flexible display unit is made about a predetermined virtual reference axis when the bending of the flexible display unit is sensed by the sensing unit, and output the event information on the flexible display unit when the bending of the flexible display unit satisfies the reference condition as the determined result.

In one exemplary embodiment, when the bending of the flexible display unit is maintained for a predetermined time or more, the control unit may output an execution screen of the application in which the event occurs on the flexible display unit, and the execution screen may be continuously output on the flexible display unit even though the bending of the flexible display unit returns to the original state.

To achieve these and other advantages and in accordance with the purpose of this specification, as embodied and broadly described herein, a control method for a mobile terminal including a flexible display unit bended, corresponding to a physical force applied from an outside thereof, includes sensing bending of the flexible display unit, in response to an event occurring in an application; and controlling the flexible display unit so that event information corresponding to the event is output on the flexible display unit according to the sensed result.

In one exemplary embodiment, the control method may further include finishing the output of the event information output on the flexible display unit, when the bending of the flexible display unit returns to an original state.

In one exemplary embodiment, in the finishing of the output of the event information, a screen image which has been output on the flexible display unit before the event information was output may be again output on the flexible display unit, based on that the output of the event information is finished.

In one exemplary embodiment, in the controlling of the flexible display unit, a popup window for informing a user that the event has occurred may be output on the flexible display unit, and when the bending of the flexible display unit is sensed in the state in which the popup window is output on the flexible display unit, the event information may be output on the flexible display unit.

In one exemplary embodiment, in the controlling of the flexible display unit, a preview image including the event information may be output on the flexible display unit, in response to the bending of the flexible display unit, and an execution screen of the application in which the event occurs may be output on the flexible display unit, corresponding to that a user input corresponding to a predetermined method is applied on the flexible display unit, in the state in which the preview image is output on the flexible display unit.

In one exemplary embodiment, in the controlling of the flexible display unit, different types of event information corresponding to the event may be output on the flexible display unit according to directions in which the flexible display unit is bended.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

A terminal may be implemented in various types. For instance, the terminal in the present description includes a mobile terminal such as a portable phone, a smart phone, a notebook computer, a digital broadcasting terminal, Personal Digital Assistants (PDA), Portable Multimedia Player (PMP), a navigation system, and a fixed terminal such as a digital TV, a desktop computer, etc. It is assumed that the terminal of the present invention is a mobile terminal. However, it will be obvious to those skilled in the art that the present invention may be also applicable to the fixed terminal, except for specific configurations for mobility.

FIG. 1 is a block diagram of a mobile terminal 100 according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, or a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal or a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views another party, whereas the voice call mode indicates a call performed while a user does not view another party. For implementation of the video call mode and the voice call mode, the mobile communication module 112 is configured to transceive at least one of voice data or image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or an e-ink display.

Some of these displays may be configured to be transparent so that outside may be seen therethrough, which may be referred to as a transparent display. A representative example of this transparent display may include a transparent organic light emitting diode (TOLED), etc. The rear surface of the display unit 151 may be transmissive. Under such configuration, a user can see an object located at rear side of the body through the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, touch inputs, and the like. The alarm unit 153 may output not only video or audio signals, but also other types of signals such as signals notifying occurrence of events in a vibration manner. Here, the video signal or audio signal may be outputted through the display unit 151 or the audio output module 152. Accordingly, the display unit 151 or the audio output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are inputted or outputted. Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display unit (hereinafter, will be referred to as 'touch screen' 151) in the locked state.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2A:
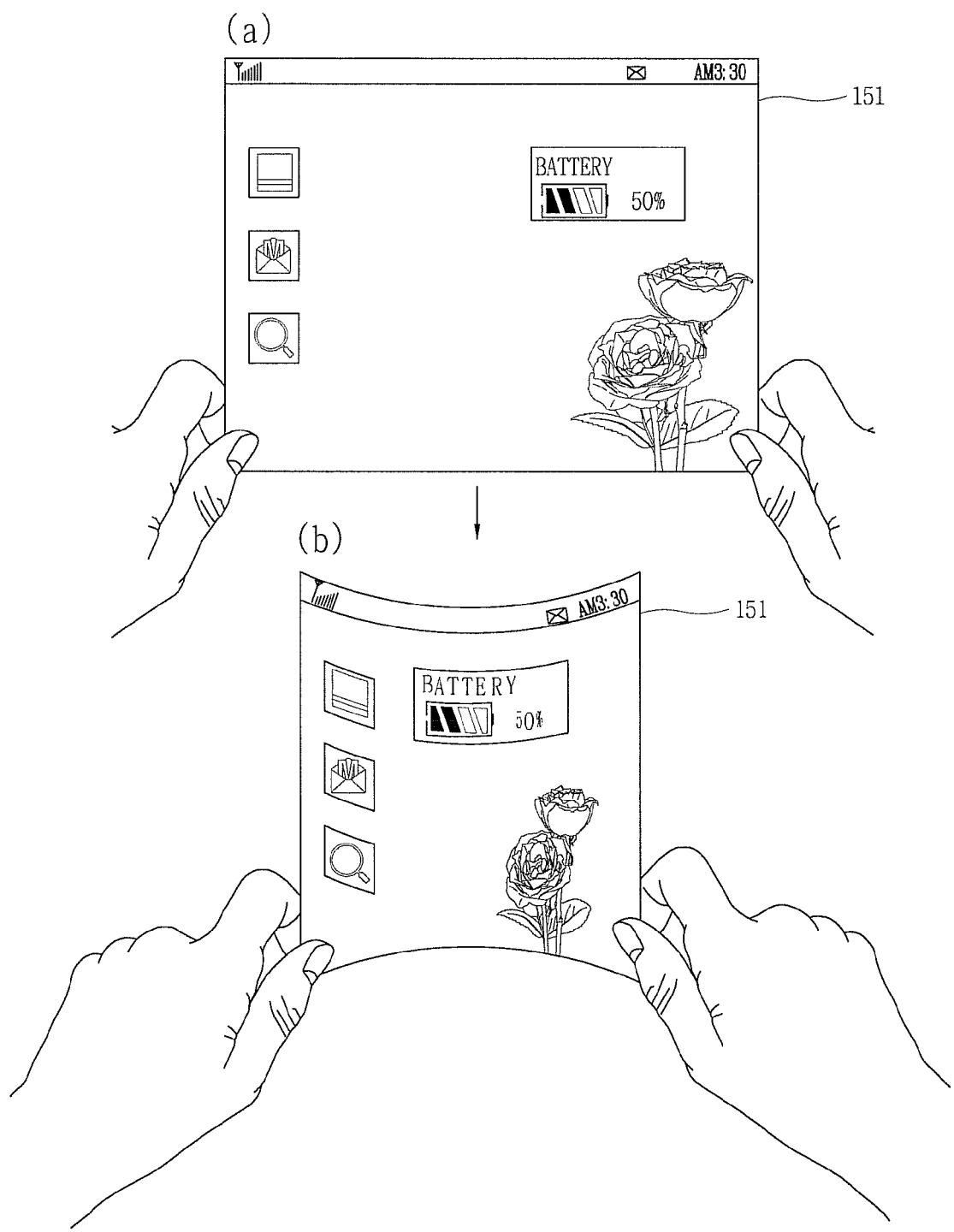
FIGS. 2A and 2B are conceptual diagrams illustrating a flexible display unit included in the mobile terminal according to an exemplary embodiment.
Figure 2B:
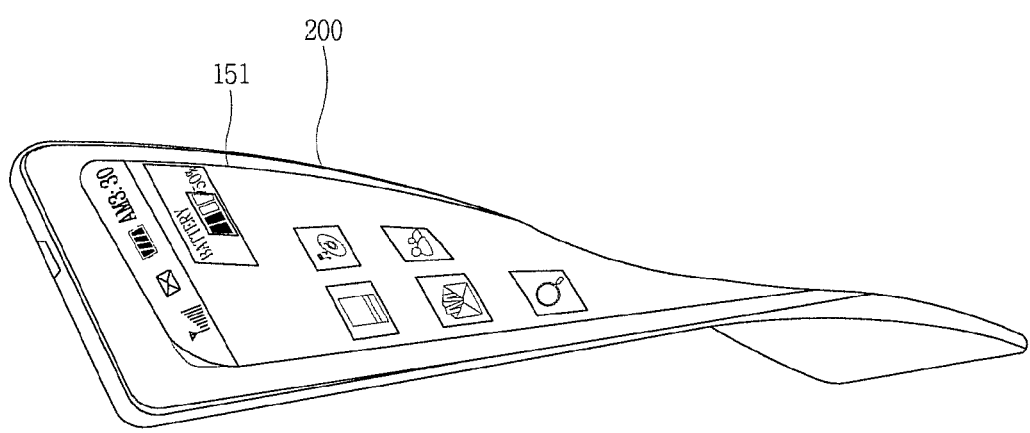

Meanwhile, in an exemplary embodiment, information processed in the mobile terminal 100 may be displayed using a flexible display. Hereinafter, a flexible display unit will be described in detail with reference to the accompanying drawings. FIGS. 2A and 2B are conceptual diagrams illustrating a flexible display unit included in the mobile terminal according to an exemplary embodiment.

As shown in FIG. 2A (a) and (b), the flexible display unit 151 includes displays which can be bended, bent, folded and rolled by a physical force applied from an outside thereof. Here, the flexible display unit 151 may includes both a general flexible display and an electronic paper (e-paper).

The general flexible display refers to a light, unbreakable and solid display fabricated on a thin and flexible substrate which can be bended, bent, folded or rolled, such as paper, while maintaining display characteristics of existing flat panel displays.

The e-paper is a display technology to which general characteristics of ink are applied, and is different from a general flat panel display in that the e-paper uses reflection of light. The e-paper can change pictures and characters, using twist balls or electrophoresis using capsules.

Meanwhile, the sensing unit 181 (See FIG. 1) is disposed on the flexible display unit 151, so as to sense bending information of the flexible display unit 151. In this specification, the term 'bending' can include all meanings of 'warping,' 'rolling,' 'folding' and 'curving.'

The sensing unit 181 may be entirely or partially disposed on the flexible display unit 151 so as to sense bending information of the flexible display unit 151. Here, the bending information of the flexible display unit 15 may include direction, degree, position and time, where the flexible display unit 151 is bended, acceleration where the bended flexible display unit 151 returns to an original state, etc. In addition, the bending information of the flexible display unit 151 may include various types of information that can be sensed due to the bending of the flexible display unit 151.

The control unit 180 may change information displayed on the flexible display unit 151 or generate a control signal for controlling a function of the mobile terminal, based on the bending information of the flexible display unit 151, sensed by the sensing unit 181.

For example, in a case where the flexible display unit 151 is bended by an external physical force, the control unit 180, as shown in FIGS. 2A (a) and (b), may rearrange, separate or synthesize screen images previously displayed on the flexible display unit 151 or change music previously played on the flexible display unit 151, according to the bent direction and angle of the flexible display unit 151 and the acceleration of the flexible display unit 151 returning to the original state.

As an example, if the flexible display unit 151 is bended inward by an external physical force, the control unit 180, as shown in FIGS. 2A (a) and (b), may control the flexible display unit 151 so that screen images displayed on the flexible display unit 151 come close to one another. On the contrary, if the flexible display unit 151 is bended outward by an external physical force, the control unit 180 may control the flexible display unit 151 so that the screen images displayed on the flexible display unit 151 are spaced apart from one another.

In addition to the methods described above, the control unit 180 can variously control the method for displaying information on the flexible display unit 151 so that a user can exactly recognize the information displayed on the flexible display unit 151, corresponding to the bending of the flexible display unit 151.

Meanwhile, the mobile terminal including the flexible display unit 151 according to the exemplary embodiment, as shown in FIG. 2B, may include a case 200 surrounding the flexible display unit 151. The case 200 may be configured to be able to be bended together with the flexible display unit 151 by an external physical force, in consideration of characteristics of the flexible display unit 151.

As mentioned above, the control unit 180 can generate a control signal related to a function of the mobile terminal, corresponding to bending information of the flexible display unit 151.

Hereinafter, a method for outputting information related to an event on a flexible display unit, in response to bending of the flexible display unit, when the event occurs in at least one of applications installed in the mobile terminal will be described in detail with reference to the accompanying drawings.

Figure 3:
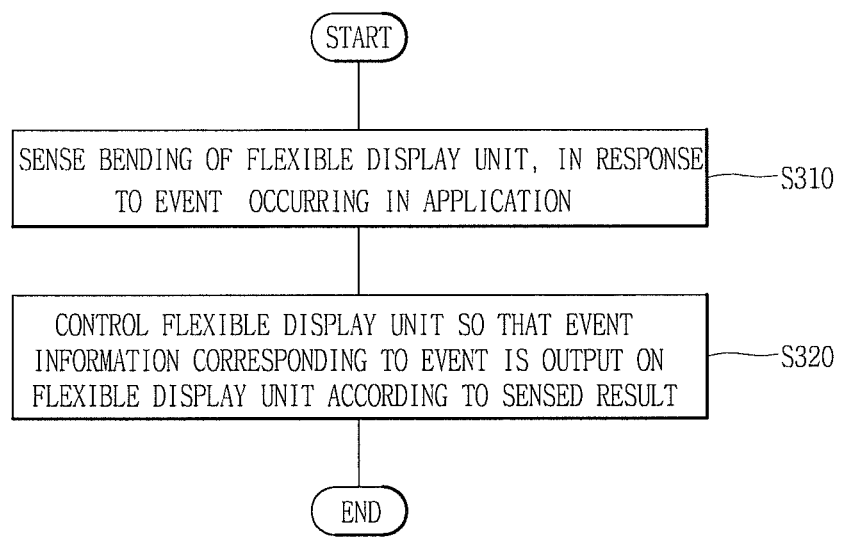
FIG. 3 is a flowchart illustrating a control method for outputting event information, in response to bending of the flexible display unit, in the mobile terminal according to an exemplary embodiment.
Figure 4A:
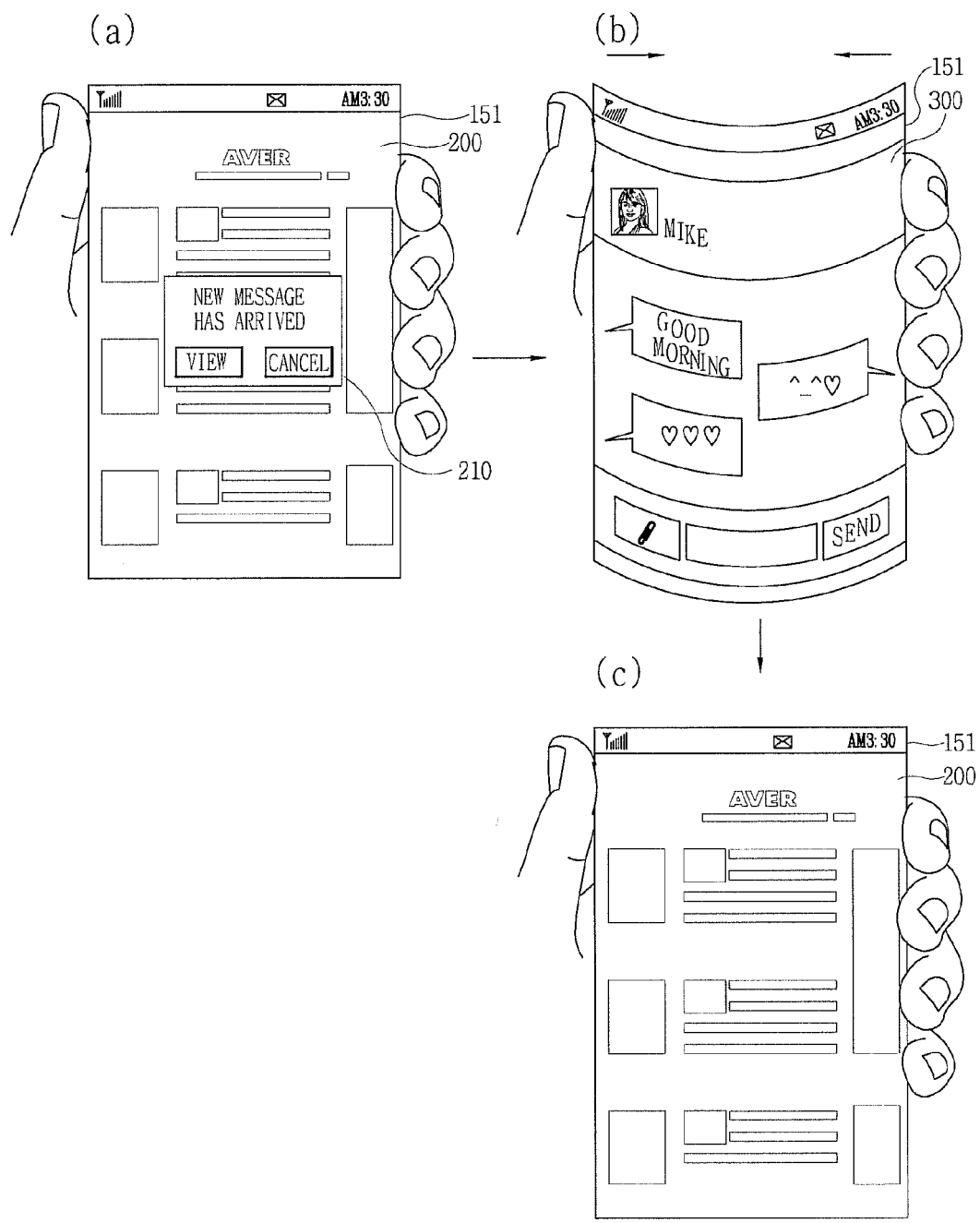

FIG. 3 is a flowchart illustrating a control method for outputting event information, in response to bending of the flexible display unit, in the mobile terminal according to an exemplary embodiment. FIGS. 4A and 4B are conceptual diagrams illustrating the control method of FIG. 3 described above.

First, the sensing unit 181 (See FIG. 1) senses bending of the flexible display unit 151 (See FIG. 2A), in response to an event occurring in an application (S310).

Here, the bending is made by an external physical force applied on the flexible display unit 151, and the external physical force may be applied by a user or an object that is not the user.

If an event occurs in the application, the control unit 180 may control the sensing unit 181 to sense the bending of the flexible display unit 151.

Here, the 'event' means that there occurs an incident which has influence on the operation of at least one application installed in the mobile terminal, that there occurs an incident which changes the content of a database (or data file) related to the at least one application or that there occurs an incident which allows data to be transmitted to or received from an external terminal or external network through the at least one application. For example, 'call reception,' 'message reception,' etc. may become as an example of the event.

If, in step S310, the bending of the flexible display unit 151 is sensed in response to the occurrence of the event, the control unit 180 controls the flexible display unit 151 so that event information corresponding to the event is output on the flexible display unit 151 (S320).

That is, the control unit 180 determines whether or not the event information corresponding to the event is to be output on the flexible display unit 151, according to the presence of sensing of the bending of the flexible display unit 151.

As such, in a case where an event occurs in the mobile terminal, using the bending characteristic of the flexible display unit 151, the control unit 180 can output event information on the flexible display unit 151.

Hereinafter, various embodiments of the control method will be described in detail with reference to the accompanying drawings.

First, FIG. 4A will be described. In a case where an event (e.g., a message reception event) occurs, the control unit 180, as shown in FIG. 4A (a), may control the sensing unit 181 to sense bending of the flexible display unit 151.

If the bending of the flexible display unit 151 is sensed by the sensing unit 181, the control unit 180, as shown in FIG. 4A (b), outputs an event information corresponding to the event on the flexible display unit 151.

That is, the control unit 180, as shown in FIG. 4A (c), outputs a message window 300 instead of a screen image (See 200 of FIG. 4A (a)) which has been output before the event occurred on the flexible display, in response to the bending of the flexible display unit 151.

The control unit 180 may control the flexible display unit 151 so that the event information is out on the flexible display unit 151 only when the bending of the flexible display unit 15 corresponds to a predetermined reference. Here, the predetermined reference is based on a user's selection or configuration of the mobile terminal. The predetermined reference may be related to at least one of speed, frequency, position, direction or maintenance time of bending of the flexible display unit 151. For example, the predetermined reference may be that the bent state of the flexible display unit 151 is maintained for a predetermined amount of time or more.

In a case where the bending of the flexible display unit 151 returns to an original state, the control unit 180, as shown in FIGS. 4A (b) and (c), may control the flexible display unit 151 so that the output of the event information corresponding to the event is finished. In this case, as shown in FIG. 4A (c), the screen image (See 200 of FIG. 4A (a)) which has been output on the flexible display unit 151 before the event information corresponding to the event was output can again output on the flexible display unit 151.

That is, the control unit 180 outputs the event information only in the state in which the flexible display unit 151 is bended, so that the event information can be temporarily provided to the user. Accordingly, the user does not stop the function being used in the mobile terminal before the event occurs, but quickly receives the event information only in the state in which the flexible display unit 151 is bended and then can reuse the function being originally used.

Meanwhile, although the bending of the flexible display unit 151 returns to the original state, the control unit 180 may control the flexible display unit 151 so that the event information is continuously output on the flexible display unit 151, based on a user's selection or configuration of the mobile terminal. In this case, although the bending does not return to the original state, the control unit 180 may finish the output of the event information when the predetermined time elapses.

In a case where the flexible display unit 151 is bended to correspond to the reference condition within the predetermined time, the control unit 180, as shown in FIGS. 4A (b) and (c), may control the flexible display unit 151 so that the event information is again output on the flexible display unit 151 even when the screen image 200 which has been output on the flexible display unit 151 before the event information corresponding to the event was output on the flexible display unit 151 is again output, based on that the bending of the flexible display unit 151 returns to the original state.

Here, the case where the flexible display unit 151 is bended to correspond to the reference condition may be related to at least one of the frequency, direction, position, speed, duration, or pattern of bending of the flexible display unit 151, or another appropriate criteria. For example, in a case where the bending of the flexible display unit 151 is consecutively sensed two times, this may satisfy the reference condition.

In a case where a control command corresponding to the predetermined condition with respect to the event information is not applied, the control unit 180 may again output the event information, corresponding to the bending of the flexible display unit 151, even when the screen image 200 which has been output on the flexible display unit 151 before the event information corresponding to the event was output on the flexible display unit 151 is again output.

That is, if a control command for stopping the output of the event information is input in the state in which the event information is output on the flexible display unit 151, the control unit 180 may not output the event information even when the bending of the flexible display unit 151 is sensed in the state in which the screen image 200 which has been output on the flexible display unit 151 before the event information corresponding to the event was output on the flexible display unit 151 is output.

Meanwhile, the control unit 180 may control the flexible display unit 151 so that the event information corresponding to the event is output on the flexible display unit 151 only when the bending of the flexible display unit 151 is sensed in the state in which a popup window (See 210 of FIG. 4B (a)) which informs the user that the event on the application has occurred is displayed on the flexible display unit 151. This is provided to prevent the event information from being displayed on the flexible display unit 151 when the user does not intend that the event information is displayed on the flexible display unit 151.

In a case where an event occurs in at least one application, the control unit 180 may output information for outputting event information corresponding to the event on the flexible display unit 151, using a popup window.

For example, as shown in FIG. 4B (a), the control unit 180 may output a guidance information which guides the user to bend the flexible display unit 151, such as "Please, bend your terminal to check the message," on the flexible display unit 151. In a case where the bending of the flexible display unit 151 for displaying the event information corresponding to the event necessarily satisfies a specific condition, the control unit 180 may display the specific condition together with the event information on the popup window 210. Here, the specific condition is a condition related to at least one of the position, direction, pattern, maintenance time or speed of bending of the flexible display unit 151, or the like.

As shown in FIGS. 4B (b) and (c), the control unit 180 outputs the event information, based on the bending of the flexible display unit 151. In a case where the bending of the flexible display unit 151 returns to the original state, the control unit 180 may finish the output of the event information.

As described above, the mobile terminal according to the exemplary embodiment can output event information, corresponding to bending of the flexible display unit, and can finish the output of the event information when the bending of the flexible display unit returns to the original state. Thus, the user can temporarily receive the event information through the mobile terminal even when performing a function different from the event, and can return to the originally performed function immediately after the output of the event information is finished.

Hereinafter, a method for displaying event information, using bending characteristics of the flexible display unit, will be described in detail with reference to the accompanying drawings. FIGS. 5A to 5G are conceptual diagrams illustrating a method for displaying event information based on bending characteristics of the flexible display unit in the mobile terminal according to an exemplary embodiment. FIGS. 6A to 6G are conceptual diagrams illustrating a method for displaying event information based on bending attribute information of the flexible display unit in the mobile terminal according to an exemplary embodiment.

As described above, in a case where an event occurs in at least one application installed in the mobile terminal, the mobile terminal according to the exemplary embodiment can display event information corresponding to the event on the flexible display unit 151, based on bending of the flexible display unit 151.

In this case, the control unit 180 can output the event information on the flexible display unit 151 only when the bending of the flexible display unit 151 corresponds to a predetermined condition.

Figure 5A:
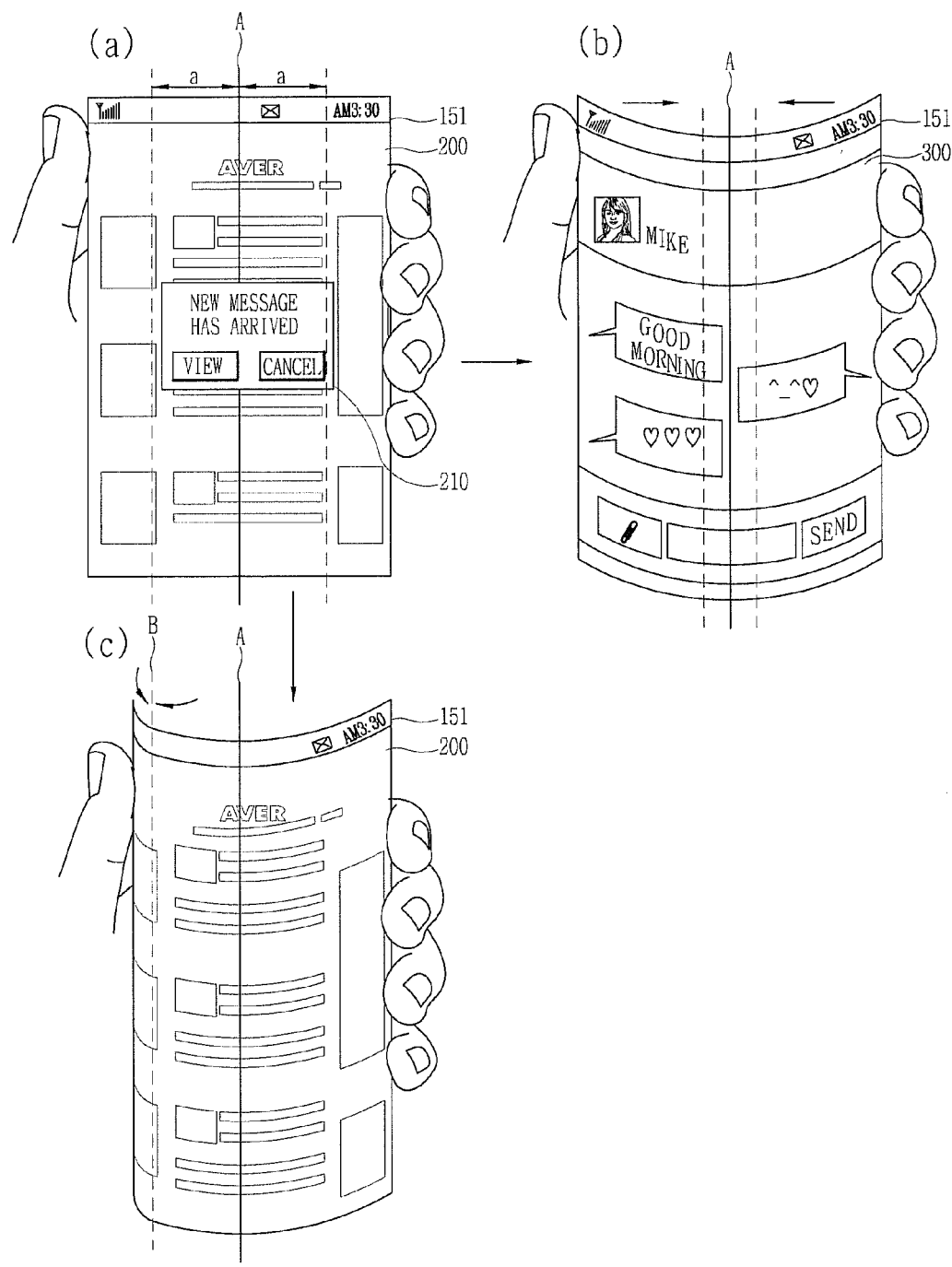
FIGS. 5A to 5G are conceptual diagrams illustrating a method for displaying event information based on bend characteristics of the flexible display unit in the mobile terminal according to an exemplary embodiment.

For example, as shown in FIG. 5A (a), the control unit 180 may control the flexible display unit 151 so that the event information is output within a certain range a about a predetermined virtual reference axis A, only when the flexible display unit 151 is bended. Thus, only when the flexible display unit 151 is bended about the predetermined virtual reference axis A as shown in FIG. 5A (a), event information 300 is output on the flexible display unit 151 as shown in FIG. 5A (b).

Here, the position of the predetermined virtual reference axis A may be variously changed depending on a user's selection.

In a case where the flexible display unit 151 is not bended about the predetermined virtual axis A but bended about another arbitrarily reference axis B, the control unit 180, as shown in FIG. 5A (c), controls the flexible display unit 151 so that the screen image 200 which has been output on the flexible display unit 151 from before the event occurred is continuously output on the flexible display unit 151.

Figure 5B:
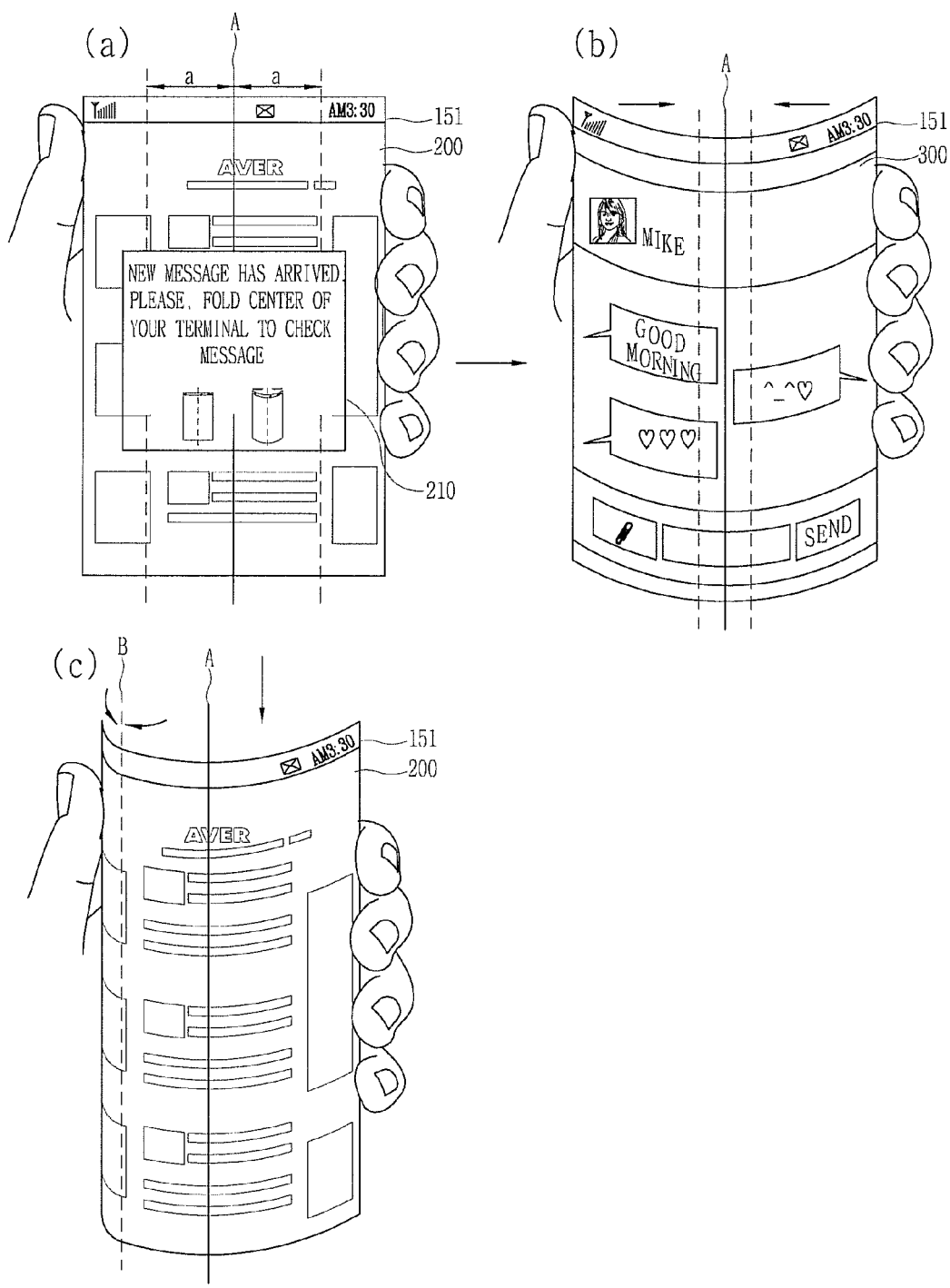

The control unit 180, as shown in FIG. 5B (a), may output bending attribute information of the flexible display unit 151, which allows event information corresponding to the event to be output on the flexible display unit 151, together with the event information on the popup window 210 that guides the user that the event has occurred.

The control unit 180 may display guidance information that allows bending corresponding to the bending attribute information to be applied on the flexible display unit 151, together with the event information, on the popup window 210. The guidance information may be displayed using an arrow for representing an image (or icon) or bending direction.

The predetermined condition for outputting the event information, related to the bending of the flexible display unit 151, may be a condition related to a specific region of the flexible display unit 151.

Figure 5C:
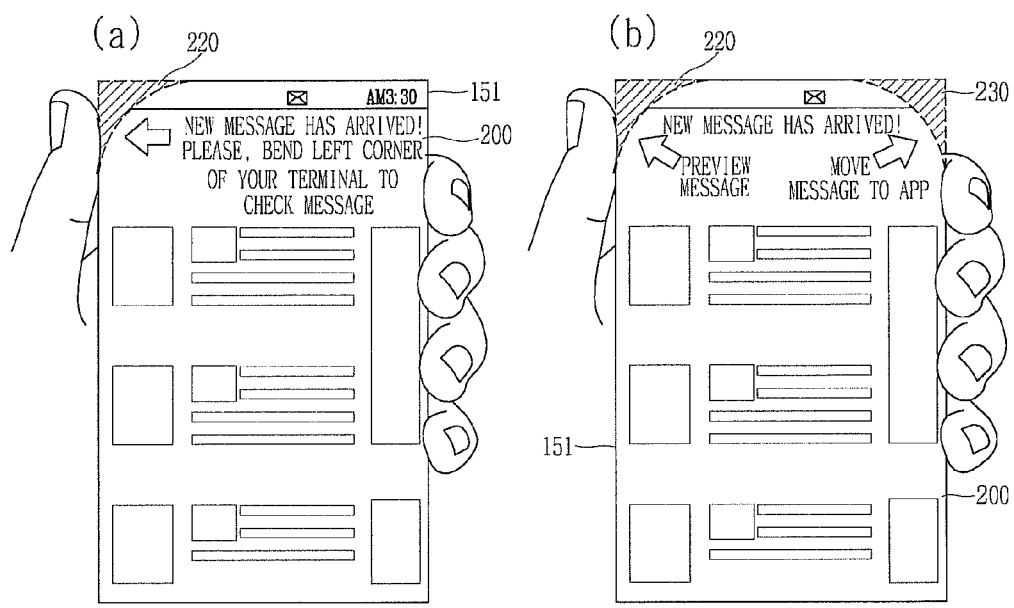

For example, in a case where a specific region 220 on the flexible display unit 151 is bended as shown in FIG. 5C (a), the control unit 180 may control the flexible display unit 151 so that event information is output on the flexible display unit 151. In this case, the position of the specific region 220 may be changed by a user's selection, and the user may display the specific region 220 to be distinguished from another region, in response to an event occurring in the mobile terminal. In a case where the user bends the specific region 220, the control unit 180 may output guidance information that informs the user that the event information is output on the flexible display unit 151

As shown in FIG. 5C (b), the control unit 180 may differently control methods for displaying event information, using a plurality of specific regions on the flexible display unit 151.

For example, in a case where a first region 220 on the flexible display unit 151 is bended, the control unit 180 may output preview information related to the event information. In a case where a second region 230 on the flexible display unit 151 is bended, the control unit 180 may output an execution screen of the application in which the event has occurred. In this case, as described above, the control unit 180 may display the specific regions 220 and 230 to be distinguished from another region so that the user can recognize the specific regions 220 and 230. As shown in FIG. 5C (b), the control unit 180 may display guidance information on event information display methods, corresponding to the specific regions 220 and 230, on the flexible display unit 151.

As such, in the mobile terminal according to the exemplary embodiment, event information is displayed only when the flexible display unit is bended about a specific region or specific reference axis, so that it is possible to prevent an error in which event information is wrongly displayed when the user bends the flexible display unit without intention to view the event information.

Meanwhile, the mobile terminal according to the exemplary embodiment can differently control the method for displaying event information, based on a bending direction of the mobile terminal.

Figure 5D:
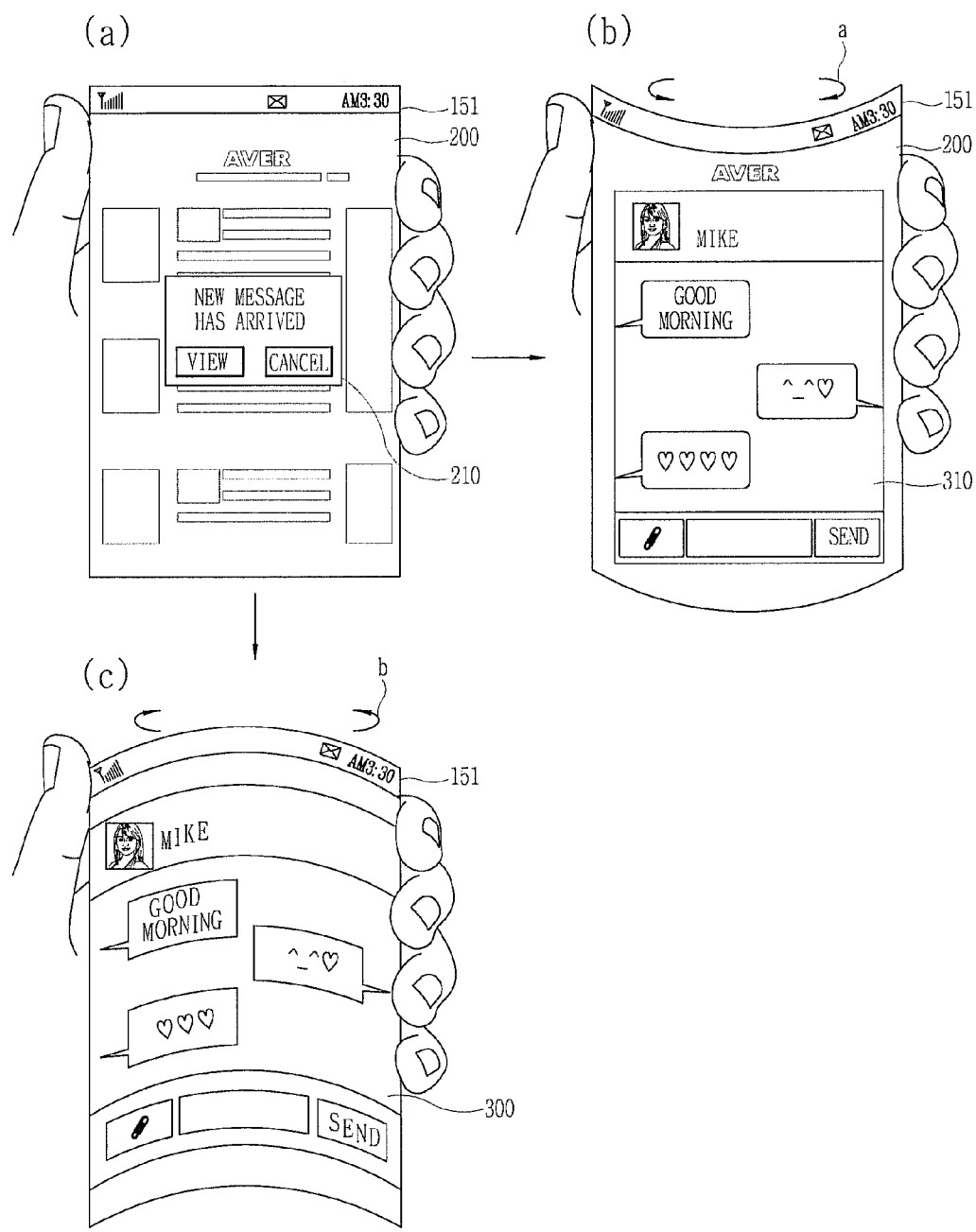

For example, in a case where the flexible display unit 151 is bended in a first direction a, in response to the occurrence of an event, the control unit 180, as shown in FIGS. 5D (a) and (b), outputs event information corresponding to the event through a preview screen 310. In a case where the flexible display unit 151 is bended in a second direction b, in response to the occurrence of an event, the control unit 180, as shown in FIGS. 5D (a) and (c), outputs an execution screen 300 of an application corresponding to the event on the flexible display unit 151.

Figure 5E:
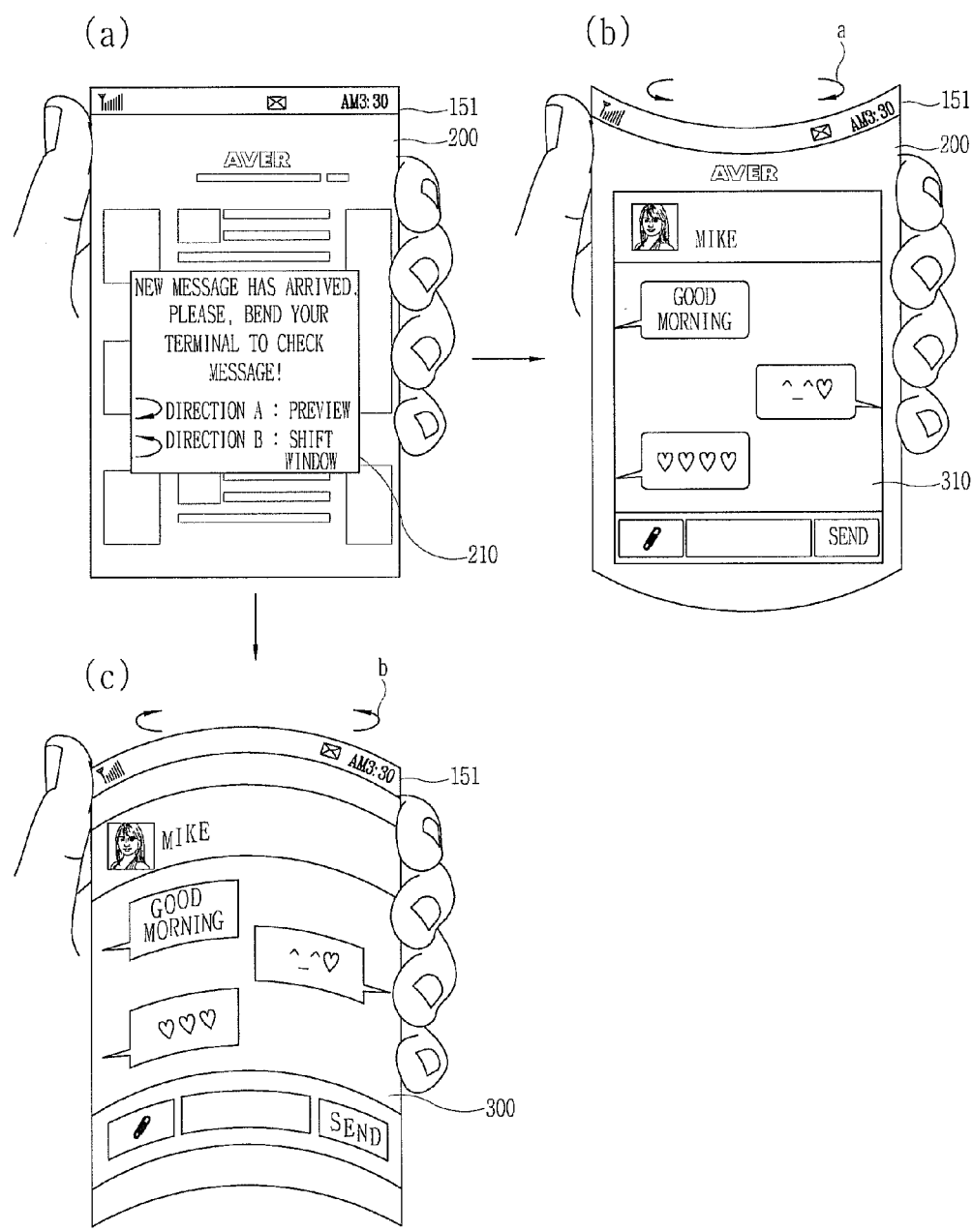

Here, the preview screen 310 is a screen on which a content corresponding to the event in the form of preview, using a popup window having a predetermined size. As shown in FIG. 5D (b), the preview screen 310 may be output while overlapping with the screen image 200 which has been output on the flexible display unit 151 before the event occurred. The control unit 180, as shown in FIG. 5E (a), may provide the user with guidance information on screen display methods respectively matched to the bending directions of the flexible display unit 151, using a popup window 210.

Figure 5F:
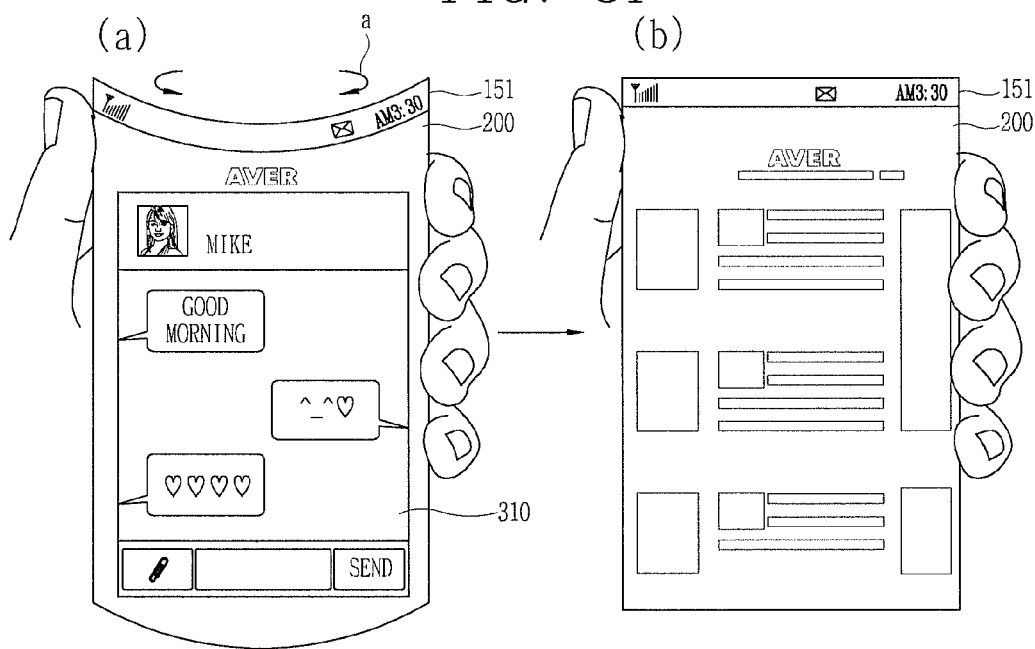

If a preview screen 310 having event information displayed thereon is displayed, corresponding to the bending of the flexible display unit 151 as shown in FIG. 5D (b), and then the bending of the flexible display unit 151 returns to an original state as shown in FIGS. 5F (a) and (b), the control unit 180 can finish the output of the preview screen 310 and again output the screen image 200 which has been output on the flexible display unit 151 before the event occurred.

Figure 5G:
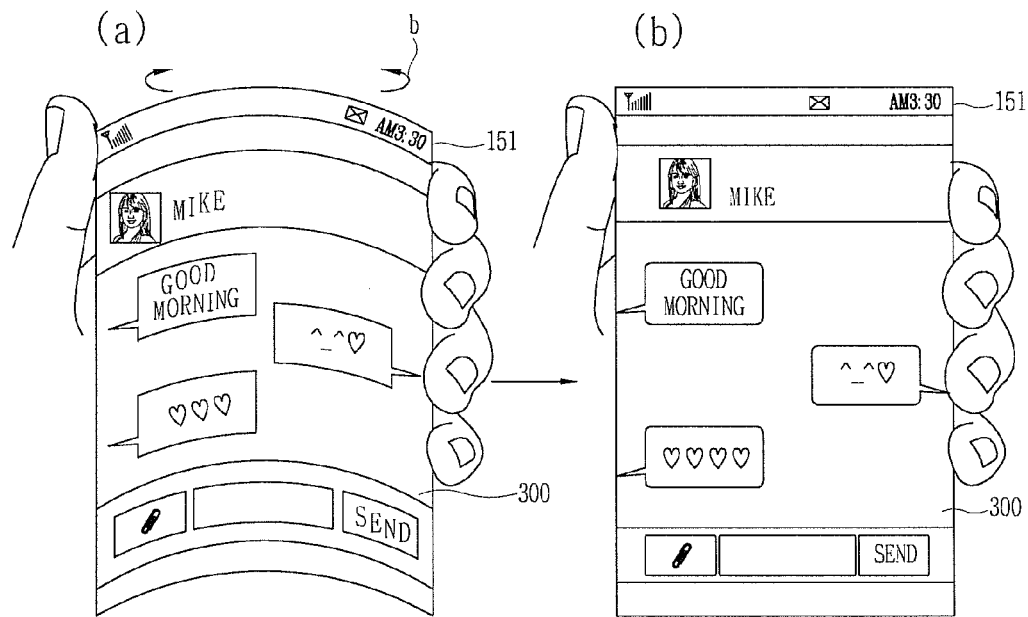

In a case where the execution screen 300 corresponding to the event is displayed on the flexible display unit 151, corresponding to the bending of the flexible display unit 151 as shown in FIG. 5D (c), unlike when the preview screen 310 is displayed, the control unit 180, as shown in FIGS. 5G (a) and (b), may not output the screen image which has been output on the flexible display unit 151 before the event occurred, even though the bending of the flexible display unit 151 returns to the original state. That is, although the bending of the flexible display unit 151 returns to the original state, the control unit 180 may control the flexible display unit 151 so that the execution screen 300 of the application corresponding to the event is continuously output on the flexible display unit 151.

As such, in a case where the bending of the flexible display unit 151 returns to the original state according to the method for displaying event information on the flexible display unit 151, the control unit 180 can differently control information displayed on the flexible display unit 151.

Although it has been described in the above example that the method for displaying event information is changed, corresponding to the bending direction of the flexible display unit 151, this is merely one example. That is, the control unit 180 may display event information through different methods, based on various characteristics (bending direction, speed, position, region, time, etc.) of the flexible display unit 151.

Hereinafter, a method will be described in which a preview screen 310 (See FIG. 6A (a)) is switched to a whole screen (or execution screen of an application), using various methods, when the preview screen 310 is displayed on the flexible display unit 151, corresponding to bending of the flexible display unit 151, will be described.

As an example, the control unit 180 may switch the preview screen 310 to the whole screen according to the bending maintenance time of the flexible display unit 151.

That is, the control unit 180 may differently perform the method for displaying event information according to whether the bending maintenance time of the flexible display unit 151 exceeds a predetermined reference time period. For example, in a case where the bending of the flexible display unit 151 returns to an original state before the reference time elapses, in the state in which the preview screen 310 is displayed on the flexible display unit 151, the control unit 180, as shown in FIGS. 6A (a) and (b), finishes the output of the preview screen 310 and outputs the screen image which has been output on the flexible display unit 151 before the event occurred.

Figure 6A:
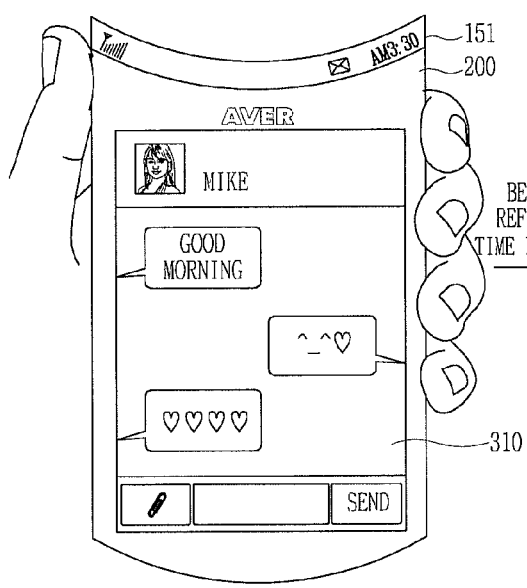
Figure 6A:
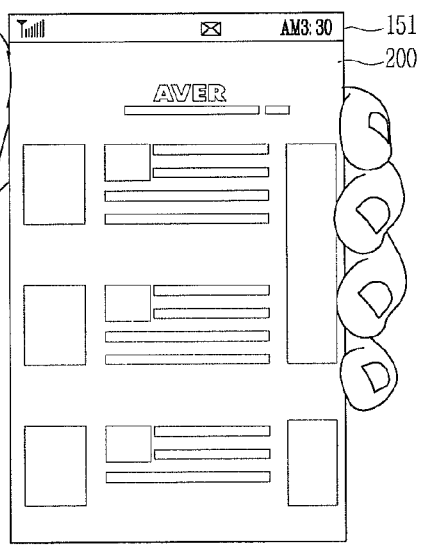
Figure 6A:
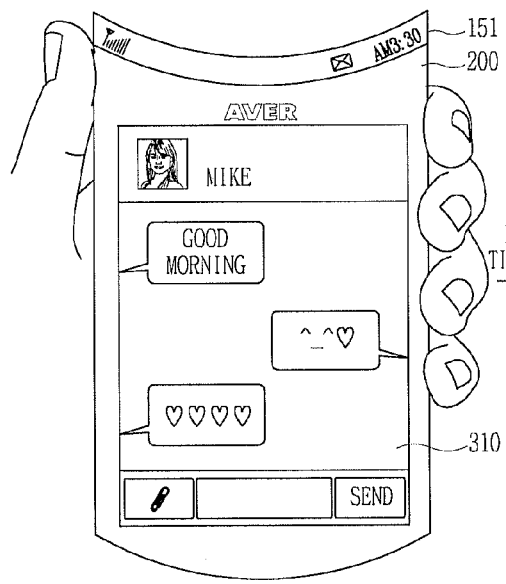
Figure 6A:
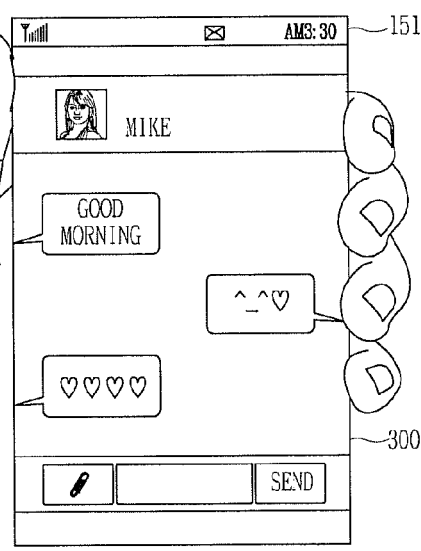

In a case where the bending of the flexible display unit 151 returns to the original state after the reference time elapses, in the state in which the preview screen 310 is output on the flexible display unit 151, the control unit 180, as shown in FIG. 6A (c) and (d), continuously outputs the execution screen of the application, corresponding to the event, even though the bending of the flexible display unit 151 is finished. As such, the control unit 180 can differently control the method for displaying event information according to the time in which the bending of the flexible display unit 151 is maintained.

Figure 6B:
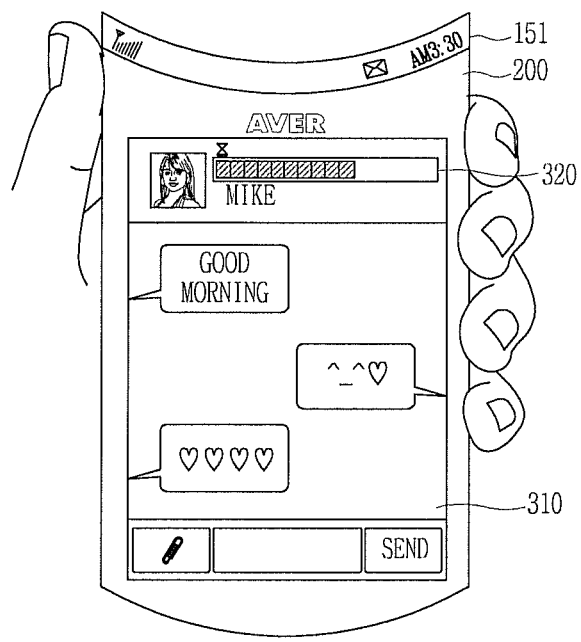

The control unit 180, as shown in FIG. 6B, may inform the user that the bending maintenance time is being counted in the mobile terminal, based on the bending of the flexible display unit 151, using visual information or voice information. That is, the control unit 180 may counts the bending maintenance time, based on the bending of the flexible display unit 151, and output the counted time on the flexible display unit 151. Thus, the user can recognize that the reference time for switching the preview screen to the whole screen is counted. Further, the user can recognize time information on how long the user should maintain the bending of the flexible display unit 151 so that the whole screen is output on the flexible display unit 151.

Meanwhile, as shown in FIG. 6B, the relationship between the reference time and an actual counting time may be output as counting time information through a progress bar 320 or another image and a text. In addition, the information on an actual counting time may be output, using various images (e.g. a sandglass, watch, etc.) or texts.

In addition to the examples described above, the control unit 180 may output a bending time of the flexible display unit 151 and a predetermined reference time, using various methods, so that the user can recognize the bending time of the flexible display unit 151 and the predetermined reference time.

As another example, if a user's touch input is applied with respect to the preview screen 310 as shown in FIG. 6C (a), the control unit 180 may output an execution screen (or whole screen 300) of an application corresponding to the event on the flexible display unit 151 as shown in FIG. 6C (b). After the whole screen 300 is output on the flexible display unit 151, the control unit 180, as shown in FIG. 6C (c), may maintain the display of the whole screen 300 even though the bending of the flexible display unit 151 returns to the original state.

As still another example, if the flexible display unit 151 is bended a predetermined number of times or more in the state in which the preview screen 310 is output on the flexible display unit 151 as shown in FIGS. 6D (a) and (b), the control unit 180 may output an execution screen (or whole screen 300) of an application corresponding to the event on the flexible display unit 151 as shown in FIG. 6D (b). After the whole screen 300 is output on the flexible display unit 151, the control unit 180, as shown in FIG. 6D (c), may maintain the display of the whole screen 300 even though the bending of the flexible display unit 151 returns to the original state.

Although not shown in these figures, if the flexible display unit 151 is bended the predetermined number of times in the state in which the bending of the flexible display unit 151 returns to the original state, the control unit 180 may again output the preview screen 310 instead of the whole screen 300 on the flexible display unit 151.

That is, the control unit 180 may mutually switch the preview screen 310 corresponding to an event and the screen image which has been output on the flexible display unit 151 before event information corresponding to the event is output, based on the bending of the flexible display unit 151. For example, the control unit 180 may toggle the displayed screen image between the preview screen 310 and a previously viewed screen image based on the bending. The bending of the flexible display unit 151 may have a prescribed pattern or another appropriate characteristic. It should be appreciated that the displayed screen image may also be toggled between various screen images based on the prescribed manipulation of the flexible display unit 151 and are not limited to the preview screen 310 and the previous screen image as disclosed above.

Figure 6E:
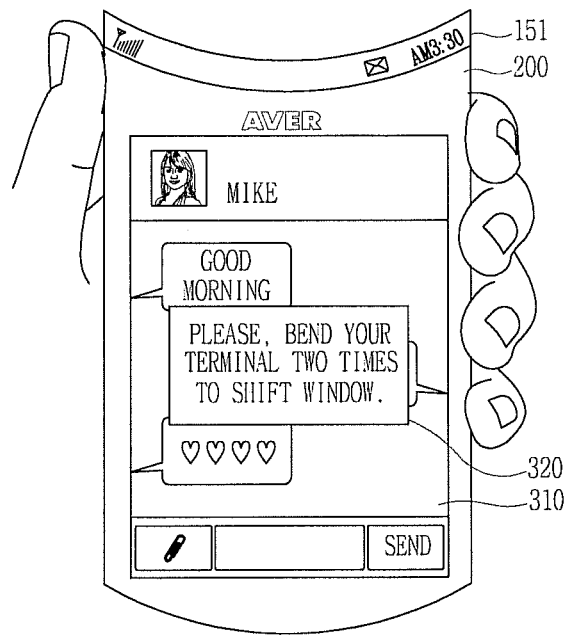

Meanwhile, the control unit 180, as shown in FIG. 6E, may control the flexible display unit 151 so that guidance information related to the method for switching the preview screen to the whole screen is provided to the user.

Figure 6G:
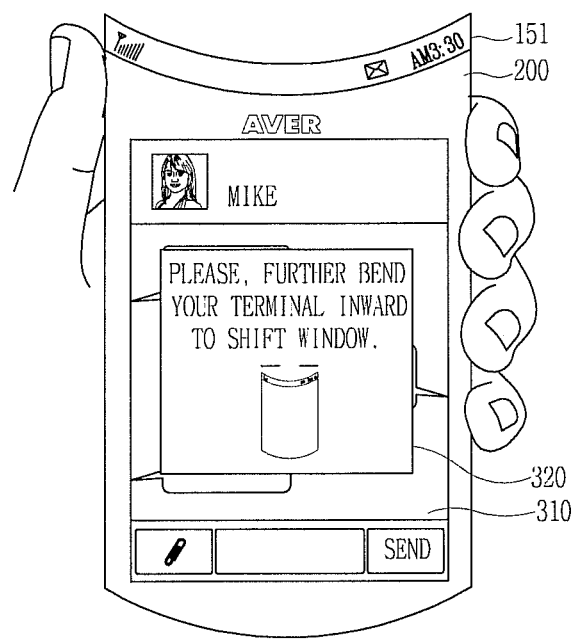

As still another example, if the flexible display unit 151 is further bended by a predetermined range in the state in which the preview screen 310 is output on the flexible display unit 151 as shown in FIGS. 6F (a) and (b), the control unit 180 may output an execution screen (or whole screen 300) of an application corresponding to the event on the flexible display unit 151 as shown in FIG. 6F (b). After the whole screen 300 is output on the flexible display unit 151, the control unit 180, as shown in FIG. 6F (c), may maintain the display of the whole screen 300 even though the bending of the flexible display unit 151 returns to the original state. The control unit 180, as shown in FIG. 6G, may control the flexible display unit 151 so that guidance information related to the method for switching the preview screen to the whole screen is provided to the user.

As described above, the mobile terminal according to the exemplary embodiment can switch the method for displaying event information on the flexible display unit, using the bending of the flexible display unit.

Meanwhile, the mobile terminal according to the exemplary embodiment can display information corresponding to an event on the flexible display unit 151 and simultaneously perform a function related to the event, in response to bending of the flexible display unit 151.

Figure 7A:
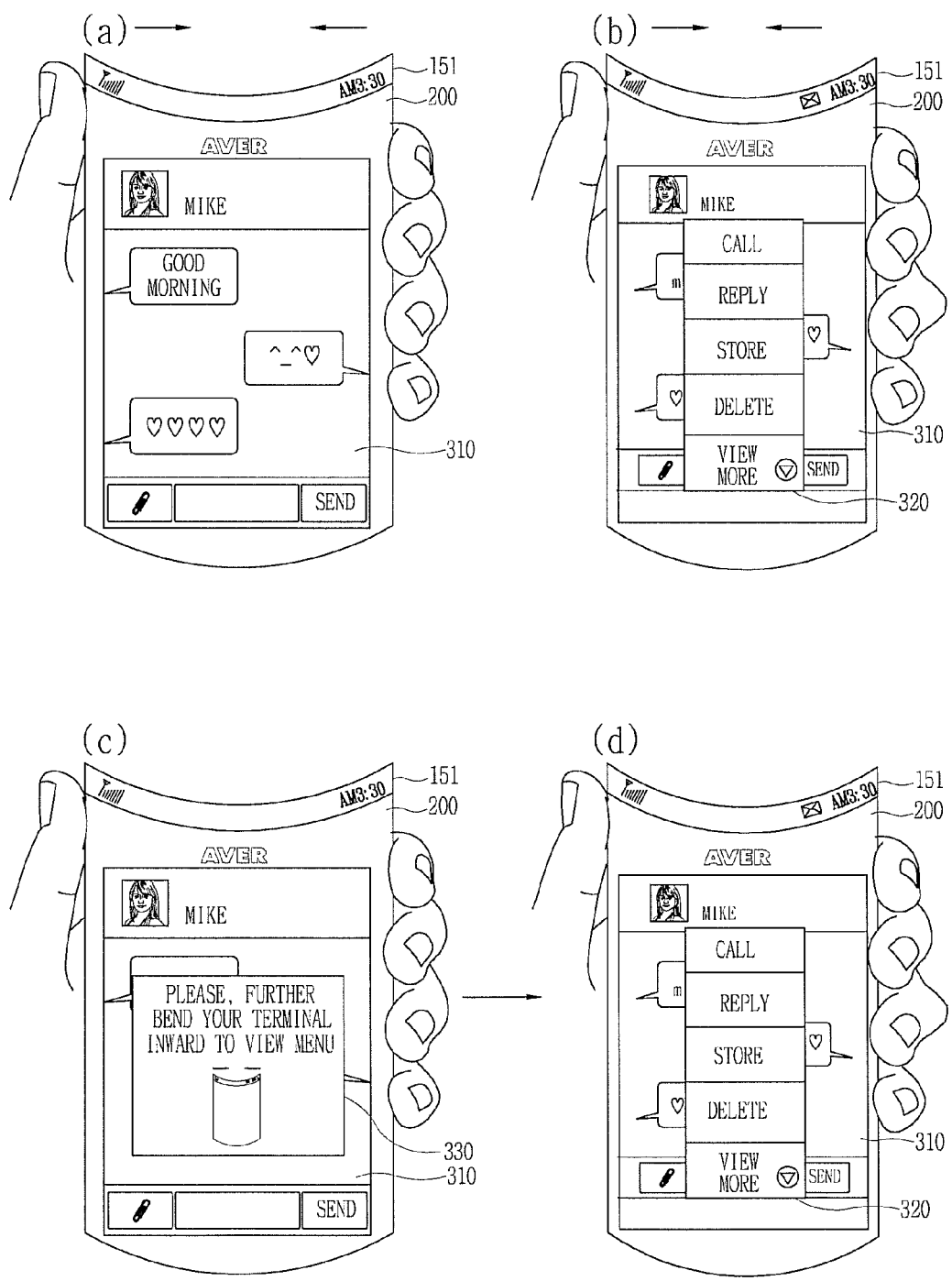
Figure 7B:
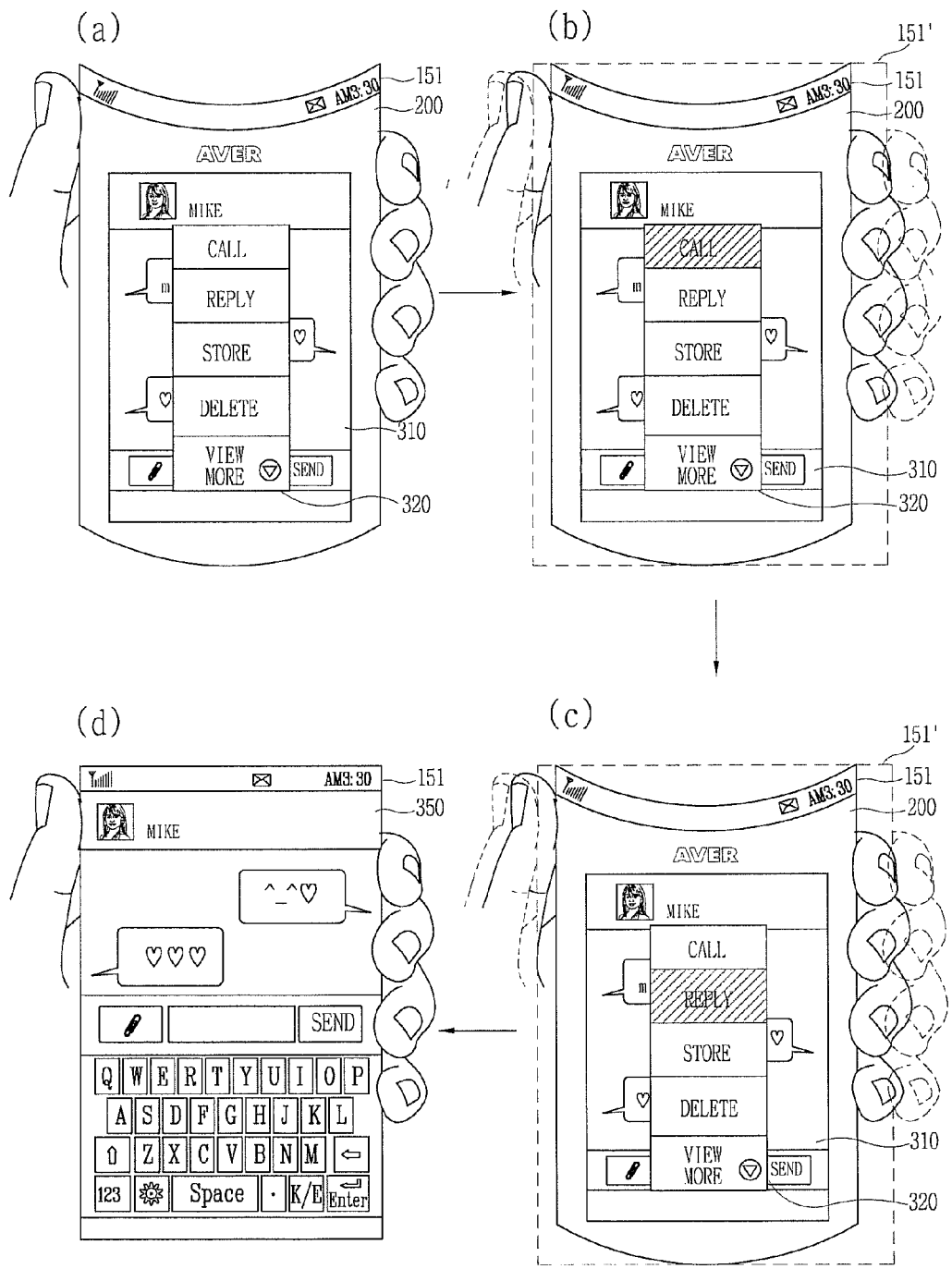

Hereinafter, a method for performing a function related to event information will be described in detail with reference to the accompanying drawings. FIGS. 7A to 7C are conceptual diagrams illustrating a method for performing a function related to an event in the mobile terminal according to an exemplary embodiment.

As shown in FIG. 7 (a), the control unit 180 may control the flexible display unit 151 so that functional items (or a menu) related to an event are displayed on the flexible display unit 151, in response to bending of the flexible display unit 151, in the state in which event information 310 is displayed on the flexible display unit 151. For example, if the degree of bending of the flexible display unit 151 is increased by a predetermined range or more as shown in FIGS. 7A (a) and (b) or if the bending of the flexible display unit 151 is consecutively performed a predetermined number of times as shown in FIGS. 7B (a) and (b), items (or a menu window 320) corresponding to functions related to the event may be displayed on the flexible display unit 151. Although not shown in these figures, the control unit 180 may display the functional items (or menu window) on the flexible display unit 151, based on that a predetermined region on the flexible display unit 151 is bended or bended in a specific direction. The control unit 180 may display the functional items (or menu window) on the flexible display unit 151, in response to that the bending for displaying the event information is performed for a predetermined time or more.

The control unit 180, as shown in FIGS. 7A (c) and (d), may control the flexible display unit 151 so that a guidance information 330 for displaying the function items is output together with the event information on one region of the flexible display unit 151.

In a case where the functional items are displayed on the flexible display unit 151 as described in FIGS. 7A and 7B, the control unit 180 may receive any one of the functional items, selected using a touch input applied by the user, and execute the selected functional.

In addition to the method of receiving any one of the functional items, selected using the touch input, the control unit 180 may receive any one of the functional items, selected using bending of the flexible display unit 151.

For example, as shown in FIGS. 7B (a) and (b), the user may select any one of the functional items 320 by applying a physical force to the flexible display unit 151 a predetermined number of times, in the state in which the functional items 320 are displayed on the flexible display unit 151. That is, the control unit 180 may select any one of the functional items 320, in response to that the bending of the flexible display unit 151 is sensed the predetermined number of times. The control unit 180, as shown in FIGS. 7C (b) and (c), may select any one of the functional items 320, in response to the bending of a region corresponding to the position at which the selected functional item is displayed. For example, in a case where the flexible display unit 151 is bended about a first reference axis a, the control unit 180, as shown in FIG. 7C (b), may select a function 'Call'. In a case where the flexible display unit 151 is bended about a second reference axis b, the control unit 180, as shown in FIG. 7C (c), may select a function 'Reply'.

As shown in FIGS. 7B and 7C, the control unit 180 may display an item corresponding to the selected function among the plurality of functional items 320 respectively corresponding to a plurality of functions to be distinguished from the other items. Here, the method for displaying the item corresponding to the selected function to be distinguished from the other items may be performed in various manners such as enlargement or reduction of the item corresponding to the selected function, change in color, display of flickering and change in transparency. The method for displaying the item corresponding to the selected function to be distinguished from the other items may be expressed as 'highlighting' of the item to be distinguished from the other items.

The control unit 180 may re-select a function as the bending of the flexible display unit 151 is changed, and may change an item to be highlighted so that the item corresponding to the re-selected function among the plurality of items 320 is distinguished from the other items.

Thus, in a case where the bending of the flexible display unit 151 is sensed a predetermined number of times, the control unit 180, as shown in FIG. 7B (b), performs highlighting on the item 'Call'. In a case where the bending of the flexible display unit 151 is again sensed the predetermined number of times, the control unit, as shown in FIG. 7B (c), performs highlighting on the item 'Reply'.

Meanwhile, in a case where an item corresponding to a function to be executed is highlighted, the user may execute the function to be executed by returning the bending of the flexible display unit 151 to an original state. Thus, if the bending of the flexible display unit 151 returns to the original state in the state in which the item 'Reply' is highlighted, the control unit 180, as shown in FIGS. 7B (c) and (d), may execute a reply function.

As described above, the mobile terminal according to the exemplary embodiment can generate a control signal for selecting any one of a plurality of objects to be selected, using the bending of the flexible display unit. Further, the mobile terminal according to the exemplary embodiment performs highlighting on an object corresponding to the bending of the flexible display unit among the plurality of object to be selected, so that the user can exactly select a desired object among the plurality of objects to be selected.

Meanwhile, in a case where a plurality of events occur in the mobile terminal according to the exemplary embodiment, the mobile terminal can output event information corresponding to any one of the plurality of events, using the bending of the flexible display unit. Hereinafter, a method for displaying any one of a plurality of events, using the bending characteristics of the flexible display unit, when the plurality of events occur, will be described in detail with reference to the accompanying drawings. FIGS. 8A to 8D are conceptual diagrams illustrating a method for displaying information corresponding to a plurality of events when the plurality of events occur in the mobile terminal according to an exemplary embodiment.

Figure 8A:
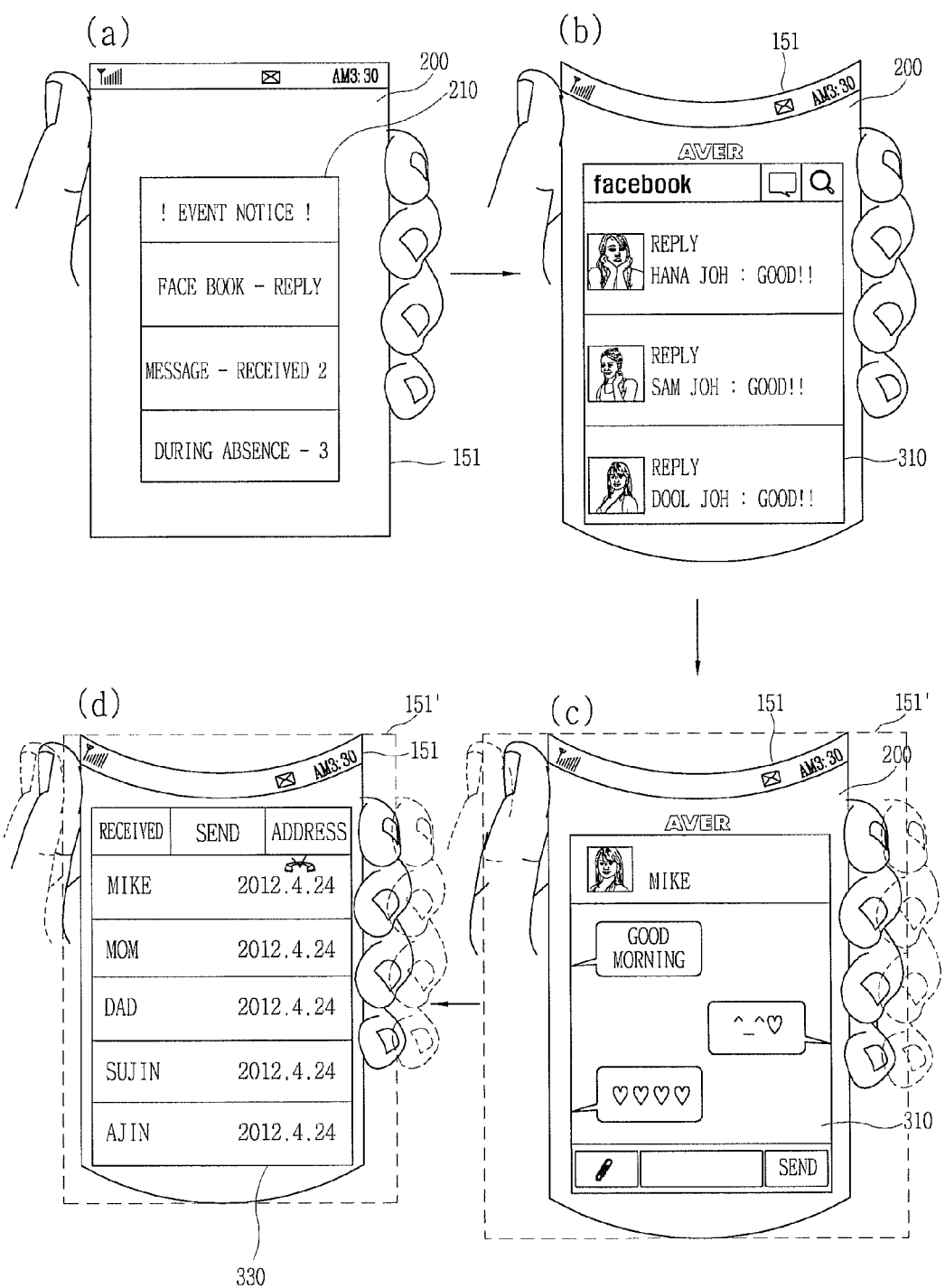
FIGS. 8A to 8D are conceptual diagrams illustrating a method for displaying information corresponding to a plurality of events when the plurality of events occur in the mobile terminal according to an exemplary embodiment.

In a case where a plurality of events occurs in the mobile terminal, the control unit 180, as shown in FIG. 8A (a), may inform the user that the plurality of events have occurred, using a popup window 210. The control unit 180 may control the flexible display unit 151 so that event information corresponding to any one of the plurality of events is output on the flexible display unit 151, based on a touch input with respect to the popup window 210.

The control unit 180, as shown in FIG. 8A (b), may output event information corresponding to any one of the plurality of events on the flexible display unit 151, in response to bending of the flexible display unit 151. Here, the event information output on the flexible display unit 151 may be event information which has most recently occurred or event information corresponding to an application according to a reference (e.g., a priority of the application) determined by the user.

In a case where the flexible display unit 151 is moved a predetermined number of times in the state in which event information corresponding to any one of the plurality of events is output on the flexible display unit 151 as shown in FIG. 8A (b), the control unit 180 may sequentially output event information different from the output event information as shown in FIGS. 8A (c) and (d).

Although not shown in these figures, in a case where the bending of the flexible display unit 151 is continuously maintained, the control unit 180 may sequentially display event information corresponding to the plurality of events at a predetermined time interval.

In a case where shaking of the flexible display unit 151 at a predetermined speed or more is sensed, the control unit 180 may output event information different from the event information output on the flexible display unit 151.

The control unit 180 may select any one of the plurality of events, based on the position at which the flexible display unit 151 is bended. That is, the control unit 180 may select an event item output in a region corresponding to the region in which the bending of the flexible display unit 151 is sensed among the plurality of event items.

Figure 8B:
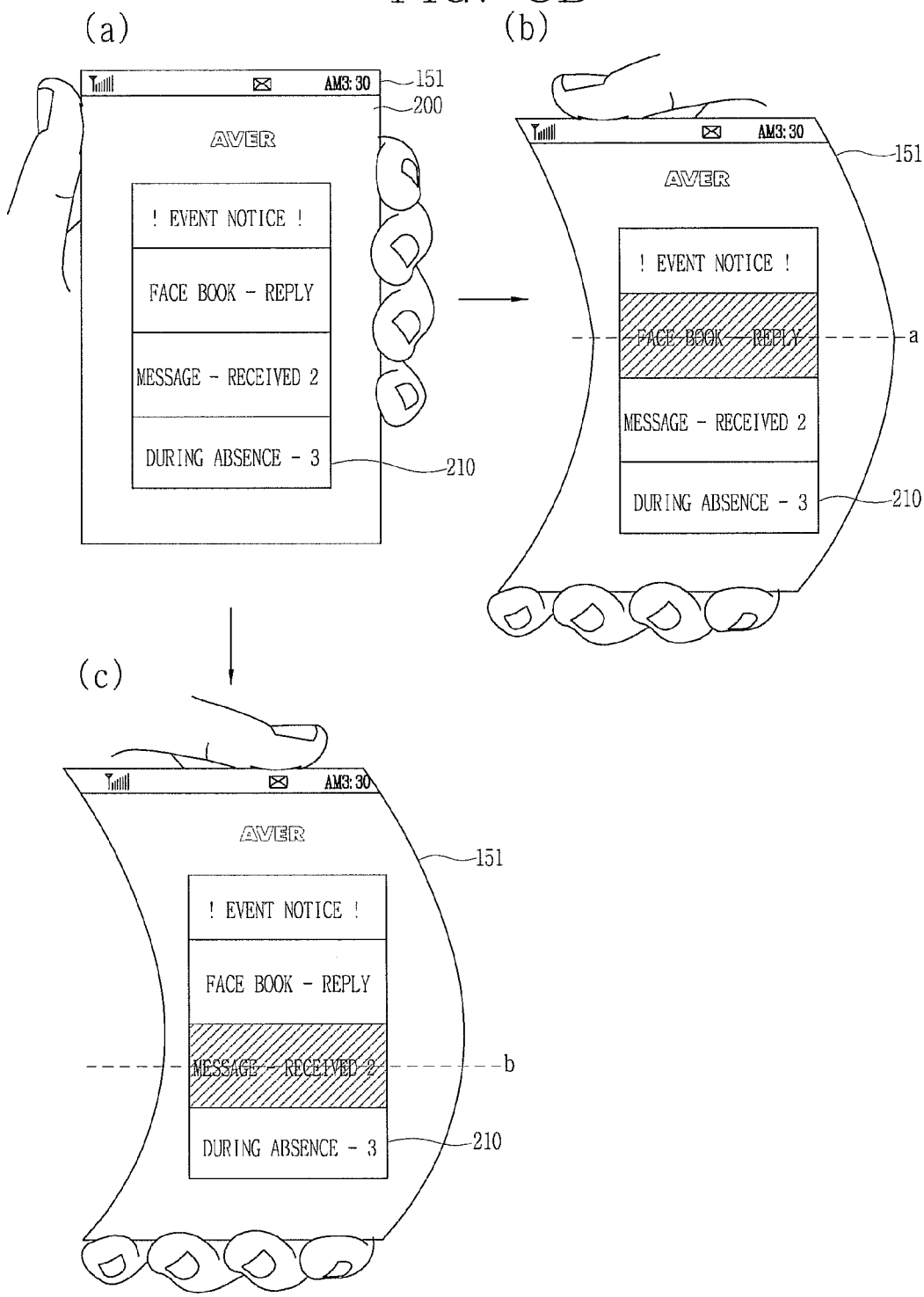

For example, in a case where the flexible display unit 151 is bended about a first reference axis a in the state in which items 210 respectively corresponding to the plurality of events are displayed on the flexible display unit 151, the control unit 180, as shown in FIGS. 8B (a) and (b), may select an event 'FACE BOOK—Reply'. In a case where the flexible display unit 151 is bended about a first reference axis b, the control unit 180, as shown in FIG. 8B (c), may select an event 'message reception'.

Figure 8C:
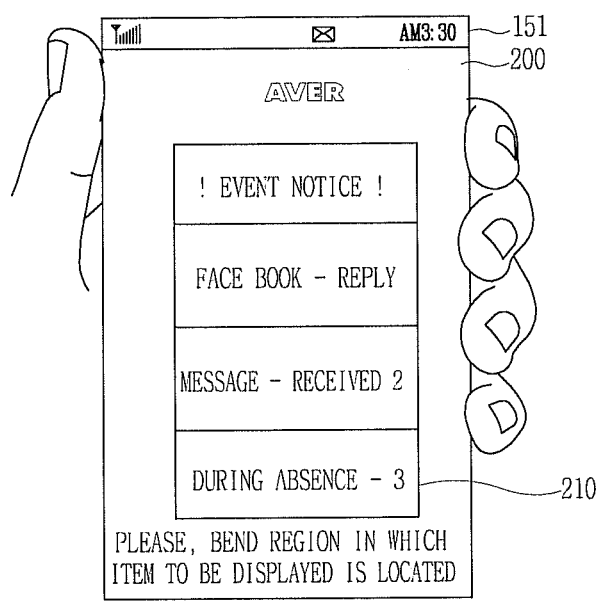

The control unit 180, as shown in FIG. 8C, may output guidance information for selecting any one of the event items, together with the event items, on one region of the flexible display unit 151.

Meanwhile, in a case where an item corresponding to the event to be confirmed by the user is selected, the control unit 180 may output event information corresponding to the selected item on the flexible display unit 151 by returning the bending of the flexible display unit 151 to an original state. Although not shown in these figures, the control unit 180 may perform highlighting on an event item to be selected as shown in FIGS. 7B and 7C.

Figure 8D:
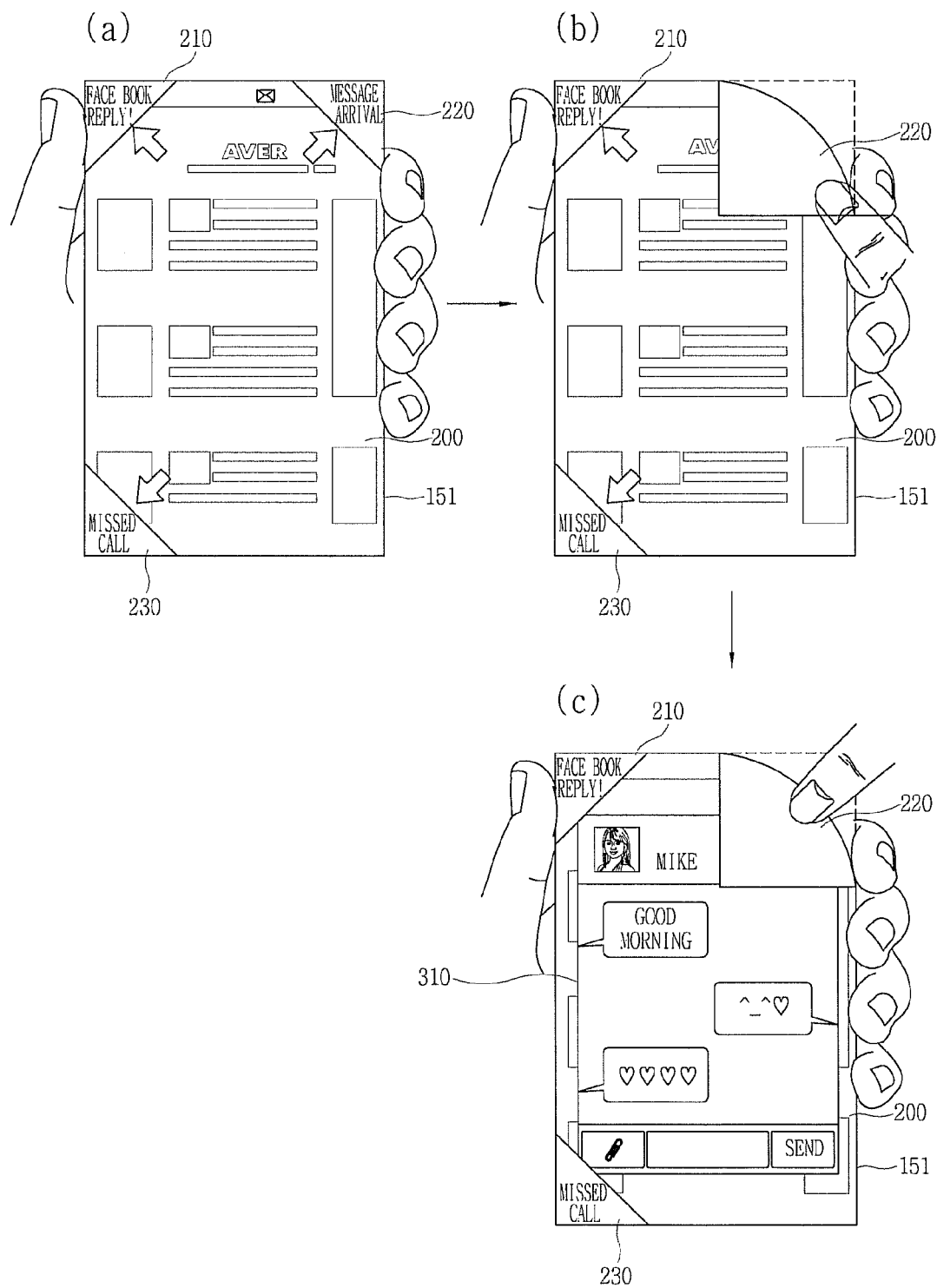

The control unit 180, as shown in FIG. 8D (a), may allow a plurality of event items to be respectively mapped to a plurality of regions 210, 220 and 230 on the flexible display unit 151. In this case, if any one of the plurality of regions 210, 220 and 230 is bended, the control unit 180 may output event information corresponding to the event item mapped to the bended region on the flexible display unit 151. For example, in a case where the second region 220 is bended as shown in FIG. 8D (b), the control unit 180 may control the flexible display unit 151 so that a message screen 310 corresponding to the message event is output on the flexible display unit 151 as shown in FIG. 8D (c).

As described above, in the mobile terminal according to the exemplary embodiment, the user can conveniently receive event information respectively corresponding to a plurality of events only by bending the flexible display unit, using the bending characteristic of the flexible display unit.

In the mobile terminal and the control method therefor, a control command for changing information output on the flexible display unit can be changed, using the bending characteristic of the flexible display unit. Thus, in a case where an event related to an application occurs, information related to the event can be output on the flexible display unit, based on bending of the flexible display unit. Accordingly, the user can easily output the information related to the event, without applying a touch input to the flexible display unit, so as to view the information related to the event.

According to an exemplary embodiment, the aforementioned method can be embodied as computer readable codes on a computer-readable recording medium. Examples of the computer readable recording medium include a ROM, RAM, CD-ROM, magnetic tapes, floppy disks, optical data storage devices, and carrier waves (such as data transmission through the Internet).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a flexible display configured to bend a prescribed amount and to display first execution screen of a first application program;
a sensor configured to sense bending of the flexible display; and
a controller configured to control the flexible display based on the sensed bending, wherein the controller:
receives an event occurred from a second application program different from the first application program while the first application is executed and the first execution screen of the first application is displayed on the flexible display,
controls the flexible display to display a pop-up window that informs the occurrence of the event, wherein the first application and the pop-up window are displayed together,
senses, via the sensor, that the flexible display is bent;
determines whether the flexible display is bent while the pop-up window is displayed on the flexible display;
controls the flexible display to display a preview image including event information corresponding to the event of the second application program only when the flexible display is bent while the pop-up window is displayed on the flexible display, wherein at least a portion of the first execution screen is changed into the preview image only when the flexible display is bent while the pop-up window is displayed on the flexible display,
determines which information displays on the flexible display based on bending maintenance time of be flexible display;
controls the flexible display to display a second execution screen of the second application program associated with the event if the bending maintenance time of the flexible display elapses the reference time, wherein the first execution screen of the first application program is switched into the second execution screen of the second application program if the bending maintenance time of the flexible display elapses the reference time, and wherein the first execution screen is no longer displayed though the bending of the flexible display returns to an original state from the a bent state if the bending maintenance time of the display elapses the reference time; and
controls the flexible display to no longer display the preview image corresponding to the second application program if the bending of the flexible display return to the original state from the bent state before the reference time elapses, wherein the first execution screen of the first application program is still displayed on the flexible display though the preview image corresponding to the second application program is no longer displayed, wherein the bending maintenance time is a length of time for which the flexible display is maintained in a bent state.

2. The mobile terminal of claim 1, wherein the controller determines whether a region in which the flexible display is bent corresponds to a predetermined region, and controls the flexible display to display the preview image including the event information based on the determined result.

3. The mobile terminal of claim 1, wherein the controller displays the second execution screen of the second application program associated with the event in response to a prescribed input applied to the flexible display while the preview image is displayed.

4. The mobile terminal of claim 3, wherein the second execution screen of the second application program is continuously displayed on the flexible display after the flexible display is returned to the original state.

5. The mobile terminal of claim 3, wherein the prescribed input is a touch input applied with respect to the preview image or a physical force applied on the flexible display.

6. The mobile terminal of claim 1, wherein the controller controls the flexible display to display different types of event information corresponding to the event according to a direction in which the flexible display is bent.

7. The mobile terminal of claim 6, wherein the controller displays the preview image that includes the event information on the flexible display when the flexible display is bent in a first direction, and displays the second execution screen of the second application program associated with the event on the flexible display when the flexible display is bent in a second direction that is different than the first direction.

8. The mobile terminal of claim 7, wherein, when the flexible display is bent in the first or second direction while the preview image is displayed on the flexible display, the second execution screen of the second application program associated with the event is displayed on the flexible display.

9. The mobile terminal of claim 1, wherein a notification is displayed to indicate an amount of time remaining within the prescribed amount of time.

10. The mobile terminal of claim 1, wherein the controller toggles the display between the preview image including the event information and the first execution screen of the first application displayed prior to the display of the preview image including the event information in response to a prescribed bending of the flexible display.

11. The mobile terminal of claim 1, wherein, when a plurality of events occur in the second application program, a plurality of items respectively corresponding to the plurality of events are output on the flexible display, and the controller controls a display of one of the plurality of events based on a bending pattern of the flexible display.

12. The mobile terminal of claim 11, wherein the bending pattern includes at least one of a frequency, a direction, an amount or a duration of the first bending of the flexible display.

13. The mobile terminal of claim 1, wherein the controller determines whether the flexible display is bent about a prescribed virtual reference axis, and displays the preview image including the event information on the flexible display according to a prescribed input to bend the flexible display about the prescribed virtual axis.

14. The mobile terminal of claim 13, wherein, when the flexible display is held in the bent state for at least a prescribed amount of time, the controller displays the second execution screen of the second application program associated with the event on the flexible display, and maintains the display of the second execution screen of the second application after the flexible display returned to the original state.

15. A control method for a mobile terminal including a flexible display configured to bend in response to an external physical force applied to the flexible display and to display a first execution screen of a first application program, the control method comprising:

receiving an event occurring in a second application program executing on the mobile terminal while the first application is executed and the first execution screen of the first application is displayed on the flexible display;

controlling the flexible display to display a pop-up window that informs the occurrence of the event, wherein the first application and the pop-up window are displayed together;

controlling the flexible display to display a preview image including event information corresponding to the event of the second application program only when the flexible display is bent while the pop-up window is displayed on the flexible display, wherein at least a portion of the first execution screen is changed into the preview image only when the flexible display is bent while the pop-up window is displayed on the flexible display, determining which information displays on the flexible display based on the bending maintenance time of the flexible display;

controlling the flexible display to display a second execution screen of the second application program associated with the event if the bending maintenance time of the flexible display elapses the reference time, wherein the first execution screen of the first application program is switched into the second execution screen of the second application program if the bending maintenance time of the flexible display elapses the reference time, and wherein the first execution screen is no longer displayed though the bending of the flexible display returns to an original state from the a bent state if the bending maintenance time of the flexible display elapses the reference time; and controlling the flexible display to no longer display the preview image corresponding to the second application program if the bending of the flexible display returns to the original state from the bent state before the reference time elapses, wherein the first execution screen of the first application program is still displayed on the flexible display though the preview image corresponding to the second application program is no longer displayed, wherein the bending maintenance time is a length of time for which the flexible display is maintained in a bent state.

* * * * *